United States Patent
Kitayama et al.

(10) Patent No.: US 10,578,773 B2
(45) Date of Patent: Mar. 3, 2020

(54) OPTICAL RESIN COMPOSITION AND FILM

(71) Applicant: KANEKA CORPORATION, Osaka-shi, Osaka (JP)

(72) Inventors: Fuminobu Kitayama, Hyogo (JP); Haruki Koyama, Osaka (JP)

(73) Assignee: KANEKA CORPORATION, Osaka (JP)

(*) Notice: Subject to any disclaimer, the term of this patent is extended or adjusted under 35 U.S.C. 154(b) by 56 days.

(21) Appl. No.: 15/100,163

(22) PCT Filed: Nov. 27, 2014

(86) PCT No.: PCT/JP2014/005936
§ 371 (c)(1),
(2) Date: May 27, 2016

(87) PCT Pub. No.: WO2015/079694
PCT Pub. Date: Jun. 4, 2015

(65) Prior Publication Data
US 2017/0031058 A1  Feb. 2, 2017

(30) Foreign Application Priority Data
Nov. 29, 2013 (JP) .................... 2013-248093

(51) Int. Cl.
G02B 1/04 (2006.01)
C08J 5/18 (2006.01)
C08F 265/06 (2006.01)
C08L 101/00 (2006.01)

(52) U.S. Cl.
CPC .............. *G02B 1/04* (2013.01); *C08F 265/06* (2013.01); *C08J 5/18* (2013.01); *C08L 101/00* (2013.01); *C08J 2333/12* (2013.01); *C08J 2333/26* (2013.01); *C08J 2335/02* (2013.01); *C08J 2433/06* (2013.01); *C08J 2433/26* (2013.01); *C08J 2435/02* (2013.01); *C08J 2451/00* (2013.01)

(58) Field of Classification Search
CPC .................................. G02B 1/04; C08J 5/18
USPC ....................................................... 428/220
See application file for complete search history.

(56) References Cited

U.S. PATENT DOCUMENTS

| | | | |
|---|---|---|---|
| 4,373,065 A | 2/1983 | Prest, Jr. | |
| 4,916,171 A | 4/1990 | Brown et al. | |
| 6,201,045 B1 | 3/2001 | Koike | |
| 6,348,542 B1* | 2/2002 | Naruse | C08F 285/00 524/504 |
| 6,586,515 B1 | 7/2003 | Koike | |
| 2005/0119389 A1 | 6/2005 | Koike | |
| 2007/0243364 A1* | 10/2007 | Maekawa | C08L 33/064 428/220 |
| 2009/0306321 A1 | 12/2009 | Koike | |
| 2014/0045995 A1 | 2/2014 | Shimamoto et al. | |
| 2016/0297958 A1 | 10/2016 | Kitayama et al. | |
| 2016/0319121 A1 | 11/2016 | Kitayama | |
| 2017/0022354 A1 | 1/2017 | Kitayama et al. | |

FOREIGN PATENT DOCUMENTS

| | | |
|---|---|---|
| CN | 1902240 A | 1/2007 |
| CN | 1946794 A | 4/2007 |
| CN | 103380175 | 10/2013 |
| JP | S63122748 A | 5/1988 |
| JP | 2002023363 | 1/2002 |
| JP | 2005023272 | 1/2005 |
| JP | 3648201 B | 5/2005 |
| JP | 3696649 B | 9/2005 |

(Continued)

OTHER PUBLICATIONS

Machine English translation_JP_2006124592_A; Horii, Etsuo; Imide Resin and Resin Composition Thereof; May 18, 2006; JPO; whole document.*
Machine English translation_JP_2009203348_A; Nakanishi, Naoaki, Resin Composition, Film, and Polarizing Plate; Sep. 10, 2009; JPO; whole document.*
International Search Report for PCT/JP2014/005936, dated Mar. 3, 2015, 5 pages including English translation.
International Search Report issued in International Application No. PCT/JP2014/005855, dated Feb. 24, 2015, 3 pages.

(Continued)

Primary Examiner — Tahseen Khan
(74) Attorney, Agent, or Firm — Hamre, Schumann, Mueller & Larson, P.C.

(57) ABSTRACT

Disclosed herein are an optical resin composition whose orientation birefringence and photoelastic birefringence are both very low and which has high transparency and which provides a film having few surface defects and excellent mechanical strength, and a film comprising the optical resin composition. Also disclosed herein is a film that has optical isotropy and excellent transparency even after stretching.

The optical resin composition contains a thermoplastic resin and a multistep-polymerized graft copolymer obtained by polymerizing, in the presence of crosslinked polymer-containing particles formed by polymerizing a monomer mixture containing a monomer represented by the following formula (4) and a polyfunctional monomer, a monomer mixture containing a monomer represented by the following formula (4) and another monofunctional monomer copolymerizable therewith.

(4)

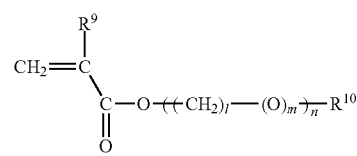

23 Claims, No Drawings

(56) References Cited

FOREIGN PATENT DOCUMENTS

| JP | 2006124592 | | | 5/2006 |
|---|---|---|---|---|
| JP | 2006124592 | A1 | * | 5/2006 |
| JP | 2006308682 | | | 11/2006 |
| JP | 2007191706 | | | 8/2007 |
| JP | 2007-254727 | | | 10/2007 |
| JP | 2008-50550 | | | 3/2008 |
| JP | 2008179778 | | | 8/2008 |
| JP | 2008276207 | A | | 11/2008 |
| JP | 2009-203348 | | | 9/2009 |
| JP | 4336586 | | | 9/2009 |
| JP | 2009203348 | a1 | * | 9/2009 |
| JP | 2009203434 | | | 9/2009 |
| JP | 2009203435 | | | 9/2009 |
| JP | 2009204860 | | | 9/2009 |
| JP | 2009269975 | | | 11/2009 |
| JP | 2009293021 | | | 12/2009 |
| JP | 2010096919 | | | 4/2010 |
| JP | 2010202798 | | | 9/2010 |
| JP | 4624845 | B | | 2/2011 |
| JP | 2012255128 | | | 12/2012 |
| JP | 5142938 | B | | 2/2013 |
| JP | 2013040325 | | | 2/2013 |
| JP | 2013204025 | | | 10/2013 |
| WO | 2010119730 | | | 10/2010 |
| WO | 2012141413 | | | 10/2012 |
| WO | 2014/002491 | | | 1/2014 |
| WO | 2014162369 | | | 10/2014 |

OTHER PUBLICATIONS

International Preliminary Report on Patentability issued in International Application No. PCT/JP2014/005855, dated May 24, 2016, 13 pages.
International Preliminary Report on Patentability issued in International Application No. PCT/JP2014/005935, dated May 31, 2016, 4 pages.
International Search Report for PCT/JP2014/005935, dated Mar. 3, 2015, 5 pages including English translation.
Office Action issued for Chinese Patent Application No. 201480063896.6, dated Feb. 3, 2017, 12 pages including partial English translation.
International Search Report dated Mar. 31, 2015, issued in International Application No. PCT/JP2014/083787, with English translation (5 pages).
Written Opinion of the International Searching Authority dated Mar. 31, 2015, issued in International Application No. PCT/JP2014/083787, with English translation (9 pages).
PCT International Preliminary Report on Patentability dated Jun. 28, 2016, by the International Bureau of WIPO in International Application No. PCT/JP2014/083787, with English translation (11 pages).
Office Action issued for counterpart Chinese Patent Application No. 201480063589.8, dated Jul. 5, 2017, 18 pages including partial English translation.
Extended European Search Report issued for European Patent Application No. 14873372.8, dated Jul. 28, 2017, 7 pages.
Extended European Search Report for counterpart European Patent Application No. 14865247.2, dated Jun. 12, 2017, 6 pages.
International Preliminary Report on Patentability issued in International Application No. PCT/JP2014/005936, dated May 31, 2016, 8 pages.
Yiding Shen, Light Chemical Additives, First Edition, China Light Industry Press, Jul. 31, 2004, p. 234 (with concise explanation of relevance in English).
Zhengjun Li, Leather Finishing Agent and Finishing Technology, First Edition, Chemical Industry Press, Jul. 31, 2002, p. 29 (with partial English machine translation).
Office Action issued for Chinese Patent Application No. 201480063894.7, dated Oct. 9, 2018, 10 pages (with English translation of Search Report).

* cited by examiner

OPTICAL RESIN COMPOSITION AND FILM

TECHNICAL FIELD

The present invention relates to an optical resin composition and a film.

BACKGROUND ART

Light-permeable resins are widely used as materials for forming film-, plate-, and lens-like optical members for use in various optical devices (e.g., films, substrates, and prism sheets for use in liquid crystal display devices; lenses in lens systems for signal reading of optical disk devices; Fresnel lenses and lenticular lenses for projection screens). Such resins are generally called "optical resins" or "optical polymers".

Birefringence is one of important optical characteristics that should be taken into consideration when optical resins are used to form optical members. Particularly, in the above-mentioned applications (liquid crystal display devices, optical disk devices, projection screens, etc.), the presence of a birefringent film or lens in an optical path adversely affects image quality or signal reading performance, and therefore the use of an optical member made of an optical resin whose birefringence is as low as possible is desired. Needless to say, camera lenses, eyeglass lenses, and the like also preferably have low birefringence.

Birefringence of an optical polymer includes "orientation birefringence" mainly caused by the orientation of main chains of the polymer and "photoelastic birefringence" caused by stress. Orientation birefringence and photoelastic birefringence have their respective signs that depend on the chemical structure of a polymer, and are properties intrinsic to individual polymers.

Orientation birefringence generally develops when main chains of a chain-like polymer (polymer chains) are oriented, and this orientation of main chains occurs in a process involving the flowing of a material, such as an extrusion-molding or stretching process during production of a polymer film or an injection molding process frequently used for production of optical members with various shapes, and is fixed and remains in an optical member. Hereinafter, the phrase "orientation birefringence is positive" means that a refractive index is large in a direction parallel to the orientation direction of polymer chains, and the phrase "orientation birefringence is negative" means that a refractive index is large in a direction orthogonal to the orientation direction of polymer chains.

Photoelastic birefringence is caused by elastic deformation (distortion) of a polymer. In the case of an optical member using a polymer, elastic deformation (distortion) occurs and remains in its material due to, for example, volume contraction caused by cooling from a temperature around the glass transition temperature of the polymer to a temperature lower than that, which becomes the cause of photoelastic birefringence. Further, the material is elastically deformed also by, for example, external force exerted on the optical member fixed to a device used at ordinary temperature (glass transition temperature or lower), which causes photoelastic birefringence. As shown by the following formula, a photoelastic constant is defined as a coefficient $\gamma$ of $\Delta\sigma$ when a birefringence difference $\Delta n$ is caused by a stress difference $\Delta\sigma$.

$$\Delta n = \gamma \Delta \sigma$$

Hereinafter, the phrase "photoelastic birefringence is positive" means that a refractive index is large in a direction parallel to a direction in which tensile stress is applied (direction in which polymer chains are oriented), and the phrase "photoelastic birefringence is negative" means that a refractive index is large in a direction orthogonal to a direction in which tensile stress is applied.

Various attempts to suppress the above-described birefringence have been reported.

For example, Patent Literature 1 discloses a non-birefringent optical resin material obtained by blending two polymer resins that are opposite in sign of orientation birefringence to each other and are completely miscible. However, it is difficult to uniformly mix the two polymer resins described in Patent Literature 1 to obtain a practical polymer resin that uniformly exhibits low orientation birefringence as a whole, and aggregates of the polymer resins may cause foreign matter defects. Further, the polymer resins blended are different in their intrinsic refractive index, and therefore light scattering occurs due to non-uniformity of refractive index, which makes it impossible to obtain an optical material excellent in transparency. Although there is no description about photoelastic birefringence, it is conceivable that a polymer composition of Example will have significantly high photoelastic birefringence. Further, the mechanical strength, especially impact resistance, of the optical resin material is not always sufficient, which causes a problem such as cracking when the optical resin material is practically used.

Patent Literature 2 discloses a method for obtaining a non-birefringent optical resin material by adding, to a matrix composed of a transparent polymer resin, a low-molecular material whose orientation birefringence tends to cancel out the orientation birefringence of the polymer resin material. The low-molecular material has a molecular weight of 5000 or less, and a resulting molded body has excellent transparency. However, there is no description about improvement in photoelastic birefringence or mechanical strength. Further, there is a case where heat resistance is reduced.

Patent Literature 3 discloses a method for obtaining an optical resin material having low orientation birefringence by adding, to a transparent polymer resin, a birefringent fine inorganic substance that is oriented in the same direction as the linked chains of the polymer resin as the polymer resin is oriented by the application of external force. Orientation birefringence can be suppressed also by this method, but there is no description about improvement in photoelastic birefringence or mechanical strength.

Patent Literature 4 discloses a method for obtaining a non-birefringent optical resin material having low orientation birefringence and low photoelastic birefringence, in which an optical material having a multicomponent system of three or more components including a binary or higher copolymerization system is obtained by selecting the combination and constituent ratio (compositional ratio) of components of the multicomponent system so that both the orientation birefringence and photoelastic birefringence of the optical material are cancelled out at the same time. This method makes it possible to extremely reduce both orientation birefringence and photoelastic birefringence at the same time, which could not heretofore be achieved. However, the composition of the optical resin material is limited to some extent to make it possible to cancel out both orientation birefringence and photoelastic birefringence at the same time, and therefore the glass transition temperature of the optical resin material is as low as less than 100° C. and there is a problem such as a reduction in mechanical strength. Further, there may be a problem that polymer decomposition occurs during molding performed under such conditions that the optical resin material is retained at high temperature, such as melt-extrusion molding for forming film.

These optical resin materials disclosed in Patent Literatures 1 to 4 have improved birefringence, but, as described above, have a problem in practical use. On the other hand, for the purpose of providing a practical optical resin material, studies have been made to improve mechanical strength and heat resistance.

For example, Patent Literature 5 discloses a method for obtaining a resin composition, which has high heat resistance and exhibits excellent mechanical strength, especially bending resistance, when formed into a film, and an optical film. The resin composition is obtained by using, in combination, an acrylic resin having a glass transition temperature of 120° C. or higher and a graft copolymer obtained by graft copolymerization of an acrylic rubber-like polymer and a vinyl-based polymerizable monomer ("core-shell"-type impact resistance improver, hereinafter also referred to as "core-shell polymer"). The graft copolymer is added to improve mechanical strength. However, no studies have been made to improve orientation birefringence and photoelastic birefringence.

Patent Literature 6 discloses an optical film obtained by molding a resin composition containing an acrylic resin (A) and an acrylic rubber (B). The acrylic resin (A) is a heat-resistant acrylic resin (A-1) containing a repeating unit derived from a methacrylate monomer, a repeating unit derived from a vinyl aromatic monomer, a repeating unit derived from a methacrylate monomer having an aromatic group, and a cyclic acid anhydride repeating unit. This literature states that the optical film has high heat resistance and excellent trimming property and has excellent optical characteristics even when stretched. The graft copolymer (core-shell polymer) as the acrylic rubber (B) is added to improve mechanical strength while maintaining transparency such as haze. However, the orientation birefringence of the optical film containing the acrylic rubber (B) is higher than that of a film of Comparative Example using only the acrylic resin (A), and the photoelastic constant (photoelastic birefringence) of the optical film containing the acrylic rubber (B) is equal to that of the film of Comparative Example using only the acrylic resin (A).

CITATION LIST

Patent Literatures

PTL 1: U.S. Pat. No. 4,373,065
PTL 2: Japanese Patent No. 3696649
PTL 3: Japanese Patent No. 3648201
PTL 4: Japanese Patent No. 4624845
PTL 5: JP-A-2009-203348
PTL 6: Japanese Patent No. 5142938

SUMMARY OF INVENTION

Technical Problem

It is an object of the present invention to provide an optical resin composition that is very low in both orientation birefringence and photoelastic birefringence, has high transparency, and provides a film having few surface defects and excellent mechanical strength, and a film made of the optical resin composition. It is also an object of the present invention to provide a film that has optical isotropy and excellent transparency even after stretching.

Solution to Problem

The present inventors have found that the above objects can be achieved by blending a thermoplastic resin with a multistep-polymerized polymer having a specific structure and a specific composition, which has led to the completion of the present invention.

More specifically, the present invention is directed to an optical resin composition comprising:
a thermoplastic resin; and
a multistep-polymerized graft copolymer obtained by polymerizing, in the presence of crosslinked polymer-containing particles formed by polymerizing a monomer mixture (a) containing a monomer represented by the following general formula (4) and/or an aromatic group-containing vinyl-based monomer and a polyfunctional monomer, a monomer mixture (b) containing a monomer represented by the following general formula (4) and another monofunctional monomer copolymerizable therewith,

[Chemical Formula 1]

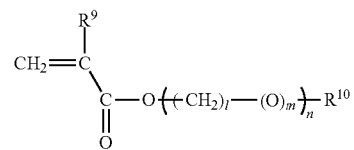

(4)

wherein $R^9$ is a hydrogen atom or a substituted or unsubstituted linear or branched alkyl group having 1 to 12 carbon atoms, $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, l is an integer of 1 to 4, m is an integer of 0 or 1, and n is an integer of 0 to 10.

Further, the present invention is also directed to an optical resin composition comprising:
a thermoplastic resin; and
a multi-layered polymer having a cross-linked polymer layer formed by polymerizing a monomer mixture (a) containing a monomer represented by the following general formula (4) and/or an aromatic group-containing vinyl-based monomer and a polyfunctional monomer and a polymer layer obtained by polymerizing a monomer mixture (b) containing a monomer represented by the following general formula (4) and another monofunctional monomer copolymerizable therewith,

[Chemical Formula 2]

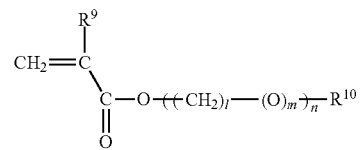

(4)

wherein $R^9$ is a hydrogen atom or a substituted or unsubstituted linear or branched alkyl group having 1 to 12 carbon atoms, $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, l is an integer of 1 to 4, m is an integer of 0 or 1, and n is an integer of 0 to 10.

It is preferred that the monomer represented by the above general formula (4) is at least one selected from the group consisting of benzyl (meth)acrylate, dicyclopentanyl (meth)acrylate, and phenoxyethyl (meth)acrylate.

It is preferred that a photoelastic constant of the thermoplastic resin and a photoelastic constant of the multistep-polymerized graft copolymer or of the multi-layered polymer are opposite in sign.

It is preferred that an orientation birefringence of the thermoplastic resin and an orientation birefringence of the multistep-polymerized graft copolymer or of the multi-layered polymer are opposite in sign.

It is preferred that the thermoplastic resin is an acrylic thermoplastic resin.

It is preferred that the thermoplastic resin is at least one selected from the group consisting of a maleimide acrylic resin, a glutarimide acrylic resin, a lactone ring-containing acrylic polymer, a partially-hydrogenated styrene-based polymer obtained by partial hydrogenation of aromatic rings of a styrene-based polymer obtained by polymerization of a styrene monomer and another monomer copolymerizable therewith, an acrylic polymer containing a cyclic acid anhydride repeating unit, and a hydroxyl group- and/or carboxyl group-containing acrylic polymer.

It is preferred that the thermoplastic resin contains a maleimide acrylic resin having a maleimide unit represented by the following general formula (5) and a (meth)acrylic ester unit,

[Chemical Formula 3]

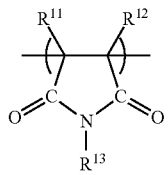

(5)

wherein $R^{11}$ and $R^{12}$ are each independently a hydrogen atom, an alkyl group having 1 to 12 carbon atoms, or an aryl group having 6 to 14 carbon atoms, and $R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from the following group A, group A: halogen atom, hydroxyl group, nitro group, alkoxy group having 1 to 12 carbon atoms, alkyl group having 1 to 12 carbon atoms, and arylalkyl group having 7 to 14 carbon atoms.

It is preferred that the maleimide acrylic resin further has a unit represented by the following general formula (3):

[Chemical Formula 4]

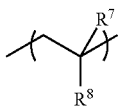

(3)

wherein $R^7$ is hydrogen or an alkyl group having 1 to 8 carbon atoms and $R^8$ is an aryl group having 6 to 10 carbon atoms.

It is preferred that the thermoplastic resin contains a glutarimide acrylic resin having a unit represented by the following general formula (1):

[Chemical Formula 5]

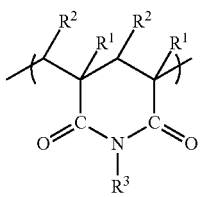

(1)

wherein and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or an aromatic ring-containing substituent group having 5 to 15 carbon atoms; and a unit represented by the following general formula (2):

[Chemical Formula 6]

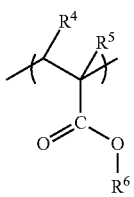

(2)

wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent group having 5 to 15 carbon atoms.

It is preferred that an amount of the crosslinked polymer-containing particles contained in the multistep-polymerized graft copolymer or an amount of the crosslinked polymer layer contained in the multi-layered polymer is 1 to 60 parts by weight per 100 parts by weight of the optical resin composition.

It is preferred that the aromatic group-containing vinyl-based monomer is styrene and/or a derivative thereof.

It is preferred that the monomer mixture (a) contains acrylic ester and/or methacrylic ester.

It is preferred that the monomer mixture (b) contains acrylic ester and/or methacrylic ester.

It is preferred that the monomer mixture (b) contains (meth)acrylic acid and/or a salt thereof.

The present invention is also directed to a pellet obtained by heat-melting the optical resin composition.

The present invention is also directed to a molded body made of the optical resin composition.

The present invention is also directed to a film made of the optical resin composition.

It is preferred that the film is formed by melt-extrusion molding.

It is preferred that the film has a thickness of 10 to 500 μm.

The present invention is also directed to a stretched film obtained by stretching the film.

It is preferred that the stretched film has a thickness of 10 to 500 μm.

The present invention is also directed to a multi-layered polymer comprising: a layer comprising a cross-linked polymer of a monomer mixture (a) containing a monomer represented by the following general formula (4) and a polyfunctional monomer; and a layer comprising a polymer of a monomer mixture (b) containing a monomer represented by the following general formula (4) and another monofunctional monomer copolymerizable therewith.

It is preferred that the monomer mixture (a) contains acrylic ester and/or methacrylic ester.

It is preferred that the monomer mixture (b) contains acrylic ester and/or methacrylic ester.

It is preferred that the monomer mixture (b) contains (meth)acrylic acid and/or a salt thereof.

Advantageous Effects of Invention

According to the present invention, it is possible to provide an optical resin composition that is very low in both orientation birefringence and photoelastic birefringence, has high transparency, few defects due to foreign matter, and excellent mechanical strength, and a film made of the optical resin composition. The film has optical isotropy and excellent transparency even after stretching.

DESCRIPTION OF EMBODIMENTS

Hereinbelow, embodiments of the present invention will be described in detail, but the present invention is not limited to these embodiments.

An optical resin composition according to the present invention and a film thereof contain, as essential components, a thermoplastic resin that serves as a matrix resin and a multistep-polymerized graft polymer or a multi-layered polymer that serves as a rubber component.

(Thermoplastic Resin)

In the present invention, a resin generally having transparency can be used as the thermoplastic resin. Specific examples of the thermoplastic resin include a wide variety of transparent thermoplastic resins such as polycarbonate resins typified by bisphenol A polycarbonate; aromatic vinyl-based resins and hydrogenated products thereof such as polystyrene, styrene-acrylonitrile copolymers, styrene-maleic anhydride resins, styrene-maleimide resins, styrene-(meth)acrylic acid resins, and styrene-based thermoplastic elastomers; polyolefin-based resins such as amorphous polyolefins, transparent polyolefins with a microcrystalline phase, and ethylene-methyl methacrylate resins; acrylic resins such as polymethylmethacrylate and styrene-methyl methacrylate resins and heat-resistant acrylic resins obtained by modifying the acrylic resins by, for example, imide cyclization, lactone cyclization, or denaturation with methacrylic acid; amorphous polyester resins or transparent polyester resins with a microcrystalline phase such as polyethylene terephthalate or polyethylene terephthalate partially denatured with a cyclohexanedimethylene group or isophthalic acid, polyethylene naphthalate, and polyarylate; polyimide resins; polyethersulfone resins; polyamide resins; cellulose-based resins such as triacetylcellulose resins; and polyphenylene oxide resins. In consideration of practical use, the thermoplastic resin is preferably selected so that a resulting molded body (3 mm thick) has a total light transmittance of 85% or higher, preferably 90% or higher, more preferably 92% or higher. More specifically, the thermoplastic resin is selected so that when a molded body having a thickness of 3 mm is formed, the molded body preferably has a total light transmittance of 85% or higher, more preferably 90% or higher, even more preferably 92% or higher.

Among these resins, acrylic resins are particularly preferred for their excellent optical characteristics, heat resistance, and molding processability. Any acrylic resin may be used as long as it is a resin obtained by polymerization of a vinyl-based monomer containing (meth)acrylic ester, but an acrylic resin obtained by polymerization of 30 to 100 wt % of methyl methacrylate and 70 to 0 wt % of a monomer copolymerizable therewith is preferred.

A preferred example of another vinyl-based monomer copolymerizable with methyl methacrylate is (meth)acrylic ester (except for methyl methacrylate) whose alkyl residue has 1 to 10 carbon atoms. Specific examples of such another vinyl-based monomer copolymerizable with methyl methacrylate include: methacrylic esters such as ethyl methacrylate, butyl methacrylate, cyclohexyl methacrylate, benzyl methacrylate, glycidyl methacrylate, epoxycyclohexylmethyl methacrylate, 2-hydroxyethyl methacrylate, 2-hydroxypropyl methacrylate, dicyclopentanyl methacrylate, 2,2,2-trifluoroethyl methacrylate, 2,2,2-trichloroethyl methacrylate, and isobornyl methacrylate; acrylic esters such as methyl acrylate, ethyl acrylate, butyl acrylate, 2-ethylhexyl acrylate, glycidyl acrylate, epoxycyclohexylmethyl acrylate, 2-hydroxyethyl acrylate, 2-hydroxypropyl acrylate; carboxylic acids such as methacrylic acid and acrylic acid and esters thereof; vinyl cyanides such as acrylonitrile and methacrylonitrile; vinyl arenes such as styrene, α-methyl styrene, monochlorostyrene, and dichlorostyrene; maleic acid and fumaric acid and esters thereof; vinyl halides such as vinyl chloride, vinyl bromide, and chloroprene; vinyl acetate; alkenes such as ethylene, propylene, butylene, butadiene, and isobutylene; halogenated alkenes; and polyfunctional monomers such as allyl methacrylate, diallyl phthalate, triallyl cyanurate, monoethyleneglycol dimethacrylate, tetraethyleneglycol dimethacrylate, tetraethyleneglycol dimethacrylate, and divinyl benzene. These vinyl-based monomers may be used singly or in combination of two or more of them.

The methyl methacrylate polymer contains methyl methacrylate in an amount of preferably 30 to 100 wt %, more preferably 50 to 99.9 wt %, even more preferably 50 to 98 wt %, and contains a monomer copolymerizable with methyl methacrylate in an amount of preferably 70 to 0 wt %, more preferably 50 to 0.1 wt %, even more preferably 50 to 2 wt %. If the methyl methacrylate content is less than 30 wt %, optical characteristics, appearance, weather resistance, and heat resistance specific to acrylic resins tend to be degraded. From the viewpoint of processability and appearance, it is preferred that a polyfunctional monomer is not used.

The glass transition temperature of the thermoplastic resin used in the present invention can be set according to use conditions and intended use. The glass transition temperature is preferably 100° C. or higher, more preferably 110° C. or higher, even more preferably 115° C. or higher, most preferably 120° C. or higher.

A specific example of an acrylic resin having a glass transition temperature of 120° C. or higher is an acrylic resin containing a maleimide structure, a glutarimide structure, a glutaric anhydride structure, a (meth)acrylic acid unit, or a lactone ring in its molecule. Examples of such an acrylic resin include maleimide acrylic resins, glutarimide acrylic resins, glutaric anhydride acrylic resins, lactonized acrylic resins, hydroxyl group- and/or carboxyl group-containing acrylic resins, and methacrylic resins. Examples of another usable resin having a glass transition temperature of 120° C. or higher include partially-hydrogenated styrene-based polymers obtained by partial hydrogenation of aromatic rings of a styrene-based polymer obtained by polymerization of a styrene monomer and another monomer copolymerizable therewith, polymers containing a cyclic acid anhydride repeating unit, polyethylene terephthalate resins, and polybutylene terephthalate resins. Among them, a maleimide acrylic resin and/or a glutarimide acrylic resin that will be described below are/is particularly preferably used because a resulting film has improved heat resistance and also has excellent optical characteristics when stretched. Particularly, a maleimide acrylic resin and a glutarimide acrylic resin are preferably used in combination as the thermoplastic resin. Both the resins are highly miscible, and therefore when they are used in combination, their excellent transparency can be maintained, both low orientation birefringence and low photoelastic birefringence are achieved, and high heat stability and high solvent resistance can also be maintained.

(Maleimide Acrylic Resin)

Specifically, the maleimide acrylic resin is a copolymer having a maleimide unit represented by the following general formula (5) and a (meth)acrylic ester unit.

[Chemical Formula 7]

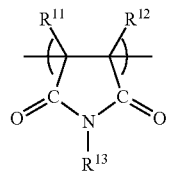

(5)

In the above general formula (5), $R^{11}$ and $R^{12}$ are each independently a hydrogen atom, an alkyl group having 1 to 12 carbon atoms, or an aryl group having 6 to 14 carbon atoms, and $R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from the following group A, group A: halogen atom, hydroxyl group, nitro group, alkoxy group having 1 to 12 carbon atoms, alkyl group having 1 to 12 carbon atoms, and arylalkyl group having 7 to 14 carbon atoms.

<$R^{11}$ and $R^{12}$>

The alkyl group having 1 to 12 carbon atoms as $R^{11}$ and $R^{12}$ is preferably an alkyl group having 1 to 6 carbon atoms, more preferably an alkyl group having 1 to 4 carbon atoms. Examples of the alkyl group having 1 to 12 carbon atoms as $R^{11}$ and $R^{12}$ include a methyl group, an ethyl group, a n-propyl group, an isopropyl group, a n-butyl group, an isobutyl group, a t-butyl group, a 2-ethylhexyl group, a nonyl group, a decanyl group, and a lauryl group. Among them, from the viewpoint of further improving transparency and weather resistance, a methyl group, an ethyl group, a n-propyl group, an isopropyl group, a n-butyl group, an isobutyl group, a t-butyl group, and a 2-ethylhexyl group are preferred, and a methyl group is more preferred.

Examples of the aryl group having 6 to 14 carbon atoms as $R^{11}$ and $R^{12}$ include a phenyl group, a naphthyl group, and an anthracenyl group. Among them, from the viewpoint of further improving heat resistance and optical characteristics such as low birefringence, a phenyl group is preferred.

$R^{11}$ and $R^{12}$ are preferably a hydrogen atom, an alkyl group having 1 to 4 carbon atoms, or a phenyl group, more preferably a hydrogen atom.

<$R^{13}$>

Examples of the arylalkyl group having 7 to 14 carbon atoms as $R^{13}$ include a benzyl group, a 1-phenylethyl group, a 2-phenylethyl group, a 3-phenylpropyl group, a 6-phenylhexyl group, and an 8-phenyloctyl group. Among them, from the viewpoint of further improving heat resistance and optical characteristics such as low birefringence, a benzyl group is preferred.

Examples of the aryl group having 6 to 14 carbon atoms as $R^{13}$ include a phenyl group, a naphthyl group, and an anthracenyl group. Among them, from the viewpoint of further improving heat resistance and optical characteristics such as low birefringence, a phenyl group is preferred.

$R^{13}$ may be an aryl group having 6 to 14 carbon atoms and a substituent group. Here, the substituent group is selected from the group (group A) consisting of a halogen atom, a hydroxyl group, a nitro group, an alkoxy group having 1 to 12 carbon atoms, an alkyl group having 1 to 12 carbon atoms, and an arylalkyl group having 7 to 14 carbon atoms.

Examples of the halogen atom as the substituent group include a fluorine atom, a chlorine atom, a bromine atom, and an iodine atom.

The alkoxy group having 1 to 12 carbon atoms as the substituent group is preferably an alkoxy group having 1 to 10 carbon atoms, more preferably an alkoxy group having 1 to 8 carbon atoms. Examples of the alkoxy group having 1 to 12 carbon atoms as the substituent group include a methoxy group, an ethoxy group, a n-propyloxy group, an isopropyloxy group, a n-butyloxy group, an isobutyloxy group, a t-butyloxy group, a 2-ethylhexyloxy group, a 1-decyloxy group, and a 1-dodecyloxy group.

Examples of the alkyl group having 1 to 12 carbon atoms as the substituent group include a methyl group, an ethyl group, a n-propyl group, an isopropyl group, a n-butyl group, an isobutyl group, a t-butyl group, a 2-ethylhexyl group, a nonyl group, a decanyl group, and a lauryl group. Among them, from the viewpoint of further improving transparency and weather resistance, a methyl group, an ethyl group, a n-propyl group, an isopropyl group, a n-butyl group, an isobutyl group, a t-butyl group, and a 2-ethylhexyl group are preferred, and a methyl group is more preferred.

Examples of the arylalkyl group having 7 to 14 carbon atoms as the substituent group include a benzyl group, a 1-phenylethyl group, a 2-phenylethyl group, a 3-phenylpropyl group, a 6-phenylhexyl group, and an 8-phenyloctyl group. Among them, a benzyl group, a 1-phenylethyl group, a 2-phenylethyl group, and a 3-phenylpropyl group are preferred.

The aryl group having 6 to 14 carbon atoms and a substituent group as $R^{13}$ is preferably a phenyl group having a substituent group or a naphthyl group having a substituent group. Examples of the aryl group having 6 to 14 carbon atoms and a substituent group include a 2,4,6-tribromophenyl group, a 2-chlorophenyl group, a 4-chlorophenyl group, a 2-bromophenyl group, a 4-bromophenyl group, a 2-methylphenyl group, a 4-methylphenyl group, a 2-ethylphenyl group, a 4-ethylphenyl group, a 2-methoxyphenyl group, a 4-methoxyphenyl group, a 2-nitrophenyl group, a 4-nitrophenyl group, and a 2,4,6-trimethylphenyl group. Among them, from the viewpoint of imparting flame retardancy, a 2,4,6-tribromophenyl group is preferred.

Examples of the cycloalkyl group having 3 to 12 carbon atoms as $R^{13}$ include a cyclopropyl group, a cyclobutyl group, a cyclopentyl group, a cyclohexyl group, a cycloheptyl group, a cyclooctyl group, a tricyclodecyl group, a bicyclooctyl group, a tricyclododecyl group, an isobornyl group, an adamantyl group, and a tetracyclododecyl group. Among them, a cyclopropyl group, a cyclobutyl group, a cyclopentyl group, a cyclohexyl group, a cycloheptyl group, and a cyclooctyl group are preferred, and from the viewpoint of further improving weather resistance and optical characteristics such as transparency and imparting low water absorbability, a cyclohexyl group is more preferred.

The alkyl group having 1 to 18 carbon atoms as $R^{13}$ is preferably an alkyl group having 1 to 10 carbon atoms, more preferably an alkyl group having 1 to 8 carbon atoms. Examples of the alkyl group having 1 to 18 carbon atoms as $R^{13}$ include a methyl group, an ethyl group, a n-propyl group, an isopropyl group, a n-butyl group, an isobutyl group, a t-butyl group, a n-pentyl group, a n-hexyl group, a n-octyl group, a n-dodecyl group, a n-octadecyl group, a 2-ethylhexyl group, a 1-decyl group, and a 1-dodecyl group. Among them, from the viewpoint of further improving weather resistance and optical characteristics such as transparency, a methyl group, an ethyl group, and an isopropyl group are preferred.

$R^{13}$ may be an alkyl group having 1 to 12 carbon atoms and a substituent group. Here, the substituent group is selected from the group (group A) consisting of a halogen atom, a hydroxyl group, a nitro group, and an alkoxy group having 1 to 12 carbon atoms.

Examples of the halogen atom as the substituent group include a fluorine atom, a chlorine atom, a bromine atom, and an iodine atom.

The alkoxy group having 1 to 12 carbon atoms as the substituent group is preferably an alkoxy group having 1 to 10 carbon atoms, more preferably an alkoxy group having 1 to 8 carbon atoms. Examples of the alkoxy group having 1 to 12 carbon atoms as the substituent group include a methoxy group, an ethoxy group, a n-propyloxy group, an isopropyloxy group, a n-butyloxy group, an isobutyloxy group, a t-butyloxy group, a 2-ethylhexyloxy group, a 1-decyloxy group, and a 1-dodecyloxy group.

Examples of the alkyl group having 1 to 12 carbon atoms and a substituent group as $R^{13}$ include a dichloromethyl group, a trichloromethyl group, a trifluoroethyl group, and a hydroxyethyl group. Among them, a trifluoroethyl group is preferred.

Specific examples of the maleimide unit represented by the general formula (5) include an unsubstituted maleimide unit, an N-methylmaleimide unit, an N-phenylmaleimide unit, an N-cyclohexylmaleimide unit, and an N-benzylmaleimide unit.

Only one kind of maleimide unit may be used, or two or more kinds of maleimide units may be used in combination.

The maleimide unit content of the maleimide acrylic resin is not particularly limited, and can be appropriately determined in consideration of, for example, the structure of $R^{13}$. However, the maleimide unit content is preferably 1.0 wt % or more, more preferably 1 wt % to 99 wt %, even more preferably 1 wt % to 80 wt % with respect to the total weight of the maleimide acrylic resin. If the maleimide unit content is not within the above range, optical isotropy tends to be poor.

The (meth)acrylic ester unit that the maleimide acrylic resin has may be the same as a unit represented by a general formula (2) that will be described later with reference to the glutarimide acrylic resin. Particularly, from the viewpoint of transparency, the maleimide acrylic resin preferably contains a methyl methacrylate unit. The (meth)acrylic ester unit content of the maleimide acrylic resin is not particularly limited, but is preferably 1 to 99 wt %, more preferably 10 to 95 wt %, even more preferably 10 to 90 wt % with respect to the total weight of the maleimide acrylic resin. Only one kind of (meth)acrylic ester unit may be used, or two or more kinds of (meth)acrylic ester units may be used in combination.

The maleimide acrylic resin preferably further has a unit represented by the following general formula (3) to adjust optical characteristics:

[Chemical Formula 8]

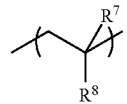

(3)

wherein $R^7$ is hydrogen or an alkyl group having 1 to 8 carbon atoms and $R^8$ is an aryl group having 6 to 10 carbon atoms.

The aromatic vinyl unit represented by the above general formula (3) is not particularly limited, and examples thereof include a styrene unit and an α-methylstyrene unit. The aromatic vinyl unit is preferably a styrene unit.

The maleimide acrylic resin may contain only one kind of unit represented by the above general formula (3) or may contain two or more kinds of units represented by the above general formula (3) between which one of $R^7$ and $R^8$ is different or both of them are different.

The amount of the unit represented by the general formula (3) contained in the maleimide acrylic resin is not particularly limited, but is preferably 0 to 40 wt %, more preferably 0 to 20 wt %, particularly preferably 0 to 15 wt % with respect to the total weight of the maleimide acrylic resin.

If necessary, the maleimide acrylic resin may further contain another unit other than the units described above.

The weight-average molecular weight of the maleimide acrylic resin is not particularly limited, but is preferably in the range of $1\times10^4$ to $5\times10^5$. By setting the weight-average molecular weight of the maleimide acrylic resin to a value within the above range, it is possible to prevent deterioration of molding processability or to prevent a resulting film from having poor mechanical strength when the film is processed. On the other hand, if the weight-average molecular weight is less than the above lower limit, a resulting film tends to have poor mechanical strength. If the weight-average molecular weight exceeds the above upper limit, viscosity during melt extrusion tends to be high, molding processability tends to be deteriorated, and molded article productivity tends to be reduced.

The maleimide acrylic resin can be obtained by, for example, the following polymerization step. Further, the maleimide acrylic resin can be refined by the following devolatilization step.

(Polymerization Step)

The maleimide acrylic resin can be obtained by polymerizing monomers selected from the monomers described above as its structural units.

In a polymerization reaction to obtain the maleimide acrylic resin according to this embodiment, monomers whose reactivities are close to each other and/or monomers whose copolymerizabilities are high are preferably combined because the compositional ratio of a resulting maleimide acrylic resin can be easily controlled based on the compositional ratio of raw materials charged into a reaction liquid. On the other hand, if monomers whose reactivities are significantly different are combined, problems may occur such as a problem a) that a monomer having low reactivity does not sufficiently react and remains as an unreacted monomer and a problem b) that the compositional ratio of a resulting maleimide acrylic resin is difficult to be predicted. Particularly, if the unreacted monomer remains, there is also a problem that the characteristics of the maleimide acrylic resin, such as transparency and light resistance, are deteriorated.

Examples of a polymerization method that can be used to obtain the maleimide acrylic resin include common polymerization methods such as cast polymerization, bulk polymerization, suspension polymerization, solution polymerization, emulsion polymerization, living radical polymerization, and anion polymerization. In order to use the maleimide acrylic resin as an optical material, mixing of minute foreign matter into the maleimide acrylic resin is preferably avoided as much as possible. From such a viewpoint, cast polymerization, solution polymerization, or suspension polymerization is preferably used, and cast polymerization or solution polymerization not using a suspension agent or an emulsifying agent is more preferably used.

A polymerization mode may be, for example, either batch polymerization or continuous polymerization. From the viewpoint of simple polymerization operation, batch polymerization is preferred, and from the viewpoint of obtaining a polymer more uniform in composition, continuous polymerization is preferred.

The temperature and time of the polymerization reaction can be appropriately adjusted depending on the types of monomers used or the ratio between monomers used. For example, the polymerization temperature is 0 to 150° C. and the polymerization time is 0.5 to 24 hours, and preferably, the polymerization temperature is 40 to 150° C. and the polymerization time is 1 to 15 hours.

In a radical polymerization reaction, a polymerization initiator may be added, if necessary. As the polymerization initiator, any initiator commonly used in radical polymerization can be used. Examples of such an initiator include: organic peroxides such as cumene hydroperoxide, diisopropylbenzene hydroperoxide, di-t-butyl peroxide, lauroyl peroxide, benzoyl peroxide, t-butyl peroxy isopropyl carbonate, t-amyl peroxy-2-ethyl hexanoate, and lauroyl peroxide; and azo compounds such as 2,2'-azobis(isobutyronitrile), 1,1'-azobis(cyclohexanecarbonitrile), 2,2'-azobis(2,4-dimethylvaleronitrile), and dimethyl-2,2'-azobisisobutyrate. These polymerization initiators may be used singly or in combination of two or more of them.

The amount of the polymerization initiator to be used is not particularly limited and may be appropriately set depending on the combination of monomers or reaction conditions, but is preferably in the range of 0.005 to 5 mass %.

A molecular weight modifier used in the polymerization reaction, if necessary, is any molecular weight modifier commonly used in radical polymerization. Particularly preferred examples of such a molecular weight modifier include mercaptan compounds such as butyl mercaptan, octyl mercaptan, dodecyl mercaptan, and 2-ethylhexyl thioglycolate. Such a molecular weight modifier is added at a concentration within such a range that the molecular weight is controlled to be within the above range.

When a solvent is used in the polymerization reaction, examples of the polymerization solvent include: aromatic hydrocarbon-based solvents such as toluene, xylene, and ethyl benzene; ketone-based solvents such as methyl ethyl ketone and methyl isobutyl ketone; and ether-based solvents such as tetrahydrofuran. These solvents may be used singly or in combination of two or more of them. If the boiling point of the solvent used is too high, the finally-obtained maleimide acrylic resin has a high residual volatile matter content. For this reason, a solvent having a boiling point of 50 to 200° C. is preferred.

In the polymerization reaction, an organic phosphorus compound or an organic acid may be added, if necessary. When these compounds coexist, there may be case where a side reaction is suppressed and/or the amount of unreacted N-substituted maleimide is reduced so that coloring of a resulting maleimide acrylic resin during molding processing is reduced.

Examples of the organic phosphorus compound include: alkyl(aryl) phosphonous acid and diesters or monoesters thereof; dialkykaryl) phosphine acid and esters thereof; alkyl(aryl) phosphonic acid and diesters or monoesters thereof, alkyl phosphonous acid and esters thereof; phosphorous acid diesters, phosphorous acid monoesters, and phosphorous acid triesters; phosphoric diesters, phosphoric monoesters, and phosphoric triesters. These organic phosphorus compounds may be used singly or in combination of two or more of them. The amount of the organic phosphorus compound to be used is preferably 0.001 to 5.0 mass % with respect to the total mass of monomers.

Examples of the organic acid include acetic acid, propionic acid, butyric acid, valeric acid, caproic acid, caprylic acid, capric acid, lauric acid, stearic acid, oleic acid, linoleic acid, linolenic acid, benzoic acid, cyclohexanecarboxylic acid, phthalic acid, isophthalic acid, and terephthalic acid, and acid anhydrides thereof. These organic acids may be used singly or in combination of two or more of them. The amount of the organic acid to be used is preferably 0.001 to 1.0 mass % with respect to the total mass of monomers.

The polymerization reaction is preferably performed at a polymer concentration of 10 to 95 mass %, more preferably 75 mass % or less, even more preferably 60 mass % or less to achieve an appropriate viscosity of a reaction liquid from the viewpoint of removing heat during polymerization. When the polymer concentration is 10 mass % or more, the adjustment of molecular weight and molecular weight distribution is easily performed. When the polymer concentration is 95 mass % or less, a polymer having a high molecular weight can be obtained.

From the viewpoint of maintaining an appropriate viscosity of the obtained polymerization reaction liquid, a polymerization solvent can be appropriately added. By maintaining an appropriate viscosity of the reaction liquid, heat removal can be controlled and the generation of microgels in the reaction liquid can be suppressed. Particularly, in the latter half of the polymerization reaction in which the viscosity increases, it is more preferred that the polymer concentration is controlled to be 50 mass % or less by appropriately adding the polymerization solvent.

The mode of appropriately adding the polymerization solvent to the polymerization reaction liquid is not particularly limited. For example, the polymerization solvent may be added continuously or intermittently. By controlling the concentration of the maleimide acrylic resin formed in the polymerization reaction liquid in this way, the uniformity of temperature in the reactor can be improved and gelation of the reaction liquid can be more sufficiently suppressed. The polymerization solvent to be added may be, for example, the same as or different from a solvent initially charged to perform the polymerization reaction. However, a solvent that is the same as a solvent initially charged to perform the polymerization reaction is preferably used. The polymerization solvent to be added may be a single solvent of only one kind of solvent or a mixed solvent of two or more kinds of solvents.

When the maleimide acrylic resin is obtained by suspension polymerization, a suspension agent and, if necessary, an auxiliary suspension agent are added to an aqueous medium. Examples of the suspension agent include: water-soluble polymers such as polyvinyl alcohol, methyl cellulose, polyoxyethylene-polyoxypropylene block copolymer, polyethylene oxide, and polyacrylamide; and inorganic substances such as calcium phosphate and magnesium pyrophosphate. The amount of the water-soluble polymer to be used is preferably 0.01 to 2 mass % with respect to the total mass of monomers, and the amount of the inorganic substance to be used is preferably 0.01 to 2 mass % with respect to the total mass of monomers. Examples of the auxiliary suspension agent include: low-molecular weight surfactants such as anion surfactants such as sodium dodecylbenzene sulfonate, sodium lauryl sulfate, sodium alkyl naphthalene sulfonate, and sodium dialkylsulfosuccinates; and water-soluble inorganic salts such as boric acid, sodium carbonate, disodium hydrogen phosphate, sodium dihydrogen phosphate, and sodium sulfate. The auxiliary suspension agent is preferably disodium hydrogen phosphate or sodium dodecylbenzene sulfonate. When an inorganic substance is used as the suspension agent, the auxiliary suspension agent is preferably used. The auxiliary suspension agent is preferably used in an amount of 0.001 to 2 mass % per 100 mass % of monomers.

(Devolatilization Step)

The devolatilization step means a step in which volatile components such as a polymerization solvent, residual monomers, and water are removed by the application of heat under reduced pressure, if necessary. If such removal treatment is insufficient, a resulting maleimide acrylic resin has a high residual volatile matter content, and therefore the maleimide acrylic resin may be colored due to alteration or the like during molding, or molding defects such as bubbles or silver streaks may occur. The residual volatile matter content is 1 mass % or less, preferably 0.5 mass % or less, more preferably 0.4 mass % or less, even more preferably 0.3 mass % or less per 100 mass % of the maleimide acrylic resin. The residual volatile matter content corresponds to the total amount of residual monomers that have not been reacted in the above-described polymerization reaction, a polymerization solvent, and a side-reaction product.

Examples of an apparatus used in the devolatilization step include a devolatilization apparatus including a heat exchanger and a devolatilization tank; a vent-equipped extruder; and an apparatus in which a devolatilizer and an extruder are arranged in series. When a vent-equipped extruder is used, the extruder may have one vent or two or more vents, but preferably has two or more vents.

The temperature of the devolatilization step is preferably 150 to 350° C., more preferably 170 to 330° C., even more preferably 200 to 300° C. If the temperature is less than 150° C., there is a case where the maleimide acrylic resin has a high residual volatile matter content. On the other hand, if the temperature exceeds 350° C., there is a case where a resulting maleimide acrylic resin is colored or decomposed.

The pressure of the devolatilization step is preferably 931 to 1.33 hPa (700 to 1 mmHg), more preferably 800 to 13.3 hPa (600 to 10 mmHg), even more preferably 667 to 20.0 hPa (500 to 15 mmHg). If the pressure exceeds 931 hPa (700 mmHg), there is a case where volatile matter is likely to remain. On the other hand, if the pressure is less than 1.33 hPa (1 mmHg), there is a case where devolatilization is difficult to be industrially performed.

The treatment time is appropriately selected depending on the amount of residual volatile matter, but is preferably as short as possible in order to suppress the coloring or decomposition of a resulting maleimide acrylic resin.

In a case where the reaction conversion rate of monomers in the polymerization reaction is low, a large amount of unreacted monomers remains in the polymerization solution. In this case, treatment needs to be performed for a long time at a high treatment temperature to reduce the residual volatile matter content of a resulting maleimide acrylic resin. However, this causes a problem that coloring or decomposition is likely to occur. In a case where the polymerization reaction liquid containing a large amount of unreacted monomers is treated, the monomers that cause a problem can be removed from the polymerization reaction liquid by, for example, performing pretreatment in which an aromatic hydrocarbon-based solvent, a hydrocarbon-based solvent, an alcohol-based solvent or the like is added to the polymerization solution, homogenizer (emulsion and dispersion) treatment is then performed, and liquid-liquid extraction or solid-liquid extraction of the unreacted monomers is performed. When the polymerization reaction liquid after separation of the monomers by the pretreatment is subjected to the devolatilization step, the total amount of monomers remaining in 100 mass % of a resulting thermoplastic resin can be reduced to 1 mass % or less.

(Glutarimide Acrylic Resin)

The glutarimide acrylic resin has a glass transition temperature of 120° C. or higher and contains a unit represented by the following general formula (1) and a unit represented by the following general formula (2):

[Chemical Formula 9]

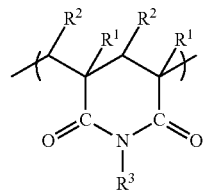

(1)

wherein $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or an aromatic ring-containing substituent group having 5 to 15 carbon atoms.

Hereinafter, the unit represented by the above general formula (1) is also referred to as "glutarimide unit".

In the above general formula (1), $R^1$ and $R^2$ are preferably each independently hydrogen or a methyl group and $R^3$ is preferably hydrogen, a methyl group, a butyl group, or a cyclohexyl group, and $R^1$, $R^2$, and $R^3$ are more preferably a methyl group, hydrogen, and a methyl group, respectively.

The glutarimide acrylic resin may contain only one kind of glutarimide unit or two or more kinds of glutarimide units between which any one of $R^1$, $R^2$, and $R^3$ in the above general formula (1) is different or all of them are different.

The glutarimide unit can be formed by imidizing a (meth)acrylic ester unit represented by the following general formula (2). Alternatively, the glutarimide unit may be formed by imidizing an acid anhydride such as maleic anhydride, a half ester obtained from the acid anhydride and a linear or branched alcohol having 1 to 20 carbon atoms, or α,β-ethylenic unsaturated carboxylic acid (e.g., acrylic acid, methacrylic acid, maleic acid, itaconic acid, crotonic acid, fumaric acid, citraconic acid).

The glutarimide unit content of the glutarimide acrylic resin is not particularly limited, and can be appropriately determined in consideration of, for example, the structure of $R^3$. However, the glutarimide unit content is preferably 1.0 wt % or more, more preferably 3.0 wt % to 90 wt %, even more preferably 5.0 wt % to 60 wt % with respect to the total weight of the glutarimide acrylic resin. If the glutarimide unit content is less than the above lower limit, a resulting glutarimide acrylic resin tends to be poor in heat resistance or tends to have impaired transparency. On the other hand, if the glutarimide unit content exceeds the above upper limit, heat resistance and melt viscosity become unnecessarily high, which tends to deteriorate molding processability, significantly decrease the mechanical strength of a resulting film when the film is processed, or impair transparency.

The glutarimide unit content is calculated in the following manner.

The resin is subjected to $^1$H-NMR analysis using $^1$H-NMR BRUKER Avance III (400 MHz) to determine the amount (mol %) of each monomer unit, such as a glutarimide unit or an ester unit, contained in the resin, and then the monomer unit content (mol %) is converted to a monomer unit content (wt %) using the molecular weight of each monomer unit.

For example, when the resin is composed of a glutarimide unit whose $R^3$ in the above general formula (1) is a methyl group and a methyl methacrylate unit, a glutarimide unit content (wt %) can be determined from the following calculation formula using the area a of a peak derived from protons of O—$CH_3$ of methyl methacrylate and appearing at about 3.5 to 3.8 ppm and the area b of a peak derived from protons of N—$CH_3$ of glutarimide and appearing at about 3.0 to 3.3 ppm.

[Methyl methacrylate unit content $A$ (mol %)]=100×$a/(a+b)$

[Glutarimide unit content $B$ (mol %)]=100×$b/(a+b)$

[Glutarimide unit content (wt %)]=100×($b$×(molecular weight of glutarimide unit)/($a$×(molecular weight of methyl methacrylate unit)+$b$×(molecular weight of glutarimide unit))

It is to be noted that even when the resin contains a monomer unit other than the above units, the glutarimide unit content (wt %) can be determined in the same manner as described above from the amount (mol %) of each monomer unit contained in the resin and the molecular weight of each monomer unit.

When the optical resin composition according to the present invention is used for, for example, a polarizer protective film, the glutarimide unit content is preferably 20 wt % or less, more preferably 15 wt % or less, even more preferably 10 wt % or less because birefringence is more likely to be suppressed.

[Chemical Formula 10]

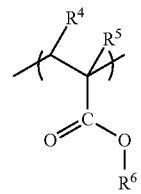

(2)

wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent group having 5 to 15 carbon atoms. Hereinafter, the unit represented by the above general formula (2) is also referred to as "(meth)acrylic ester unit". It is to be noted that in this specification, "(meth)acrylic" refers to "methacrylic or acrylic".

In the above general formula (2), $R^4$ and $R^5$ are preferably each independently hydrogen or a methyl group and $R^6$ is preferably hydrogen or a methyl group, and $R^4$, $R^5$, and $R^6$ are more preferably hydrogen, a methyl group, and a methyl group, respectively.

The glutarimide acrylic resin may contain only one kind of (meth)acrylic ester unit or two or more kinds of (meth)acrylic ester units between which any one of $R^4$, $R^5$, and $R^6$ in the above general formula (2) is different or all of them are different.

If necessary, the glutarimide acrylic resin may further contain a unit represented by the following general formula (3) (hereinafter, also referred to as "aromatic vinyl unit"):

[Chemical Formula 11]

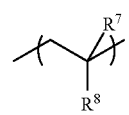

(3)

wherein $R^7$ is hydrogen or an alkyl group having 1 to 8 carbon atoms and $R^8$ is an aryl group having 6 to 10 carbon atoms.

The aromatic vinyl unit represented by the above general formula (3) is not particularly limited, and examples thereof include a styrene unit and an α-methylstyrene unit. The aromatic vinyl unit is preferably a styrene unit.

The glutarimide acrylic resin may contain only one kind of aromatic vinyl unit or two or more kinds of aromatic vinyl units between which one of $R^7$ and $R^8$ is different or both of them are different.

The aromatic vinyl unit content of the glutarimide acrylic resin is not particularly limited, but is preferably 0 to 50 wt %, more preferably 0 to 20 wt %, particularly preferably 0 to 15 wt % with respect to the total weight of the glutarimide acrylic resin. If the aromatic vinyl unit content exceeds the above upper limit, the glutarimide acrylic resin cannot have sufficient heat resistance.

However, in the present invention, the glutarimide acrylic resin preferably contains no aromatic vinyl unit from the viewpoint of improving bending resistance and transparency, reducing fish-eyes, and improving solvent resistance or weather resistance.

If necessary, the glutarimide acrylic resin may further contain another unit other than the glutarimide unit, the (meth)acrylic ester unit, and the aromatic vinyl unit.

Examples of the another unit include amide-based units such as acrylamide and methacrylamide, a glutaric anhydride unit, nitrile-based units such as acrylonitrile and methacrylonitrile, and maleimide-based units such as maleimide, N-methylmaleimide, N-phenylmaleimide, and N-cyclohexylmaleimide.

The another unit may be incorporated into the glutarimide acrylic resin by random copolymerization or graft copolymerization.

The another unit may be incorporated by copolymerization of a monomer constituting the another unit with a resin as a raw material for producing the glutarimide acrylic resin. Alternatively, the another unit incorporated into the glutarimide acrylic resin may be a by-product of the above-described imidization reaction.

The weight-average molecular weight of the glutarimide acrylic resin is not particularly limited, but is preferably in the range of $1\times10^4$ to $5\times10^5$. By setting the weight-average molecular weight of the maleimide acrylic resin to a value within the above range, it is possible to prevent deterioration of molding processability or to prevent a resulting film from having poor mechanical strength when the film is processed. On the other hand, if the weight-average molecular weight is less than the above lower limit, a resulting film tends to have poor mechanical strength. If the weight-average molecular weight exceeds the above upper limit, viscosity during melt extrusion tends to be high, molding processability tends to be deteriorated, and molded article productivity tends to be reduced.

The glass transition temperature of the glutarimide acrylic resin is preferably 120° C. or higher so that a resulting film can have excellent heat resistance. More preferably, the glass transition temperature of the glutarimide acrylic resin is 125° C. or higher. If the glass transition temperature of the glutarimide acrylic resin is lower than the above lower limit, a resulting film cannot have sufficient heat resistance.

Hereinbelow, one example of a method for producing the glutarimide acrylic resin will be described.

First, a (meth)acrylic ester polymer is produced by polymerization of (meth)acrylic ester. When the glutarimide acrylic resin contains an aromatic vinyl unit, a (meth)acrylic ester-aromatic vinyl copolymer is produced by copolymerization of (meth)acrylic ester and an aromatic vinyl compound.

The (meth)acrylic ester used in this step is preferably, for example, methyl (meth)acrylate, ethyl (meth)acrylate, butyl (meth)acrylate, isobutyl (meth)acrylate, t-butyl (meth)acrylate, benzyl (meth)acrylate, or cyclohexyl (meth)acrylate, and is more preferably methyl methacrylate.

These (meth)acrylic esters may be used singly or in combination of two or more of them. The use of two or more kinds of (meth)acrylic esters makes it possible to finally obtain a glutarimide acrylic resin containing two or more kinds of (meth)acrylic ester units.

The structure of the (meth)acrylic ester polymer or the (meth)acrylic ester-aromatic vinyl copolymer is not particularly limited as long as a subsequent imidization reaction can be performed. More specifically, the (meth)acrylic ester polymer or the (meth)acrylic ester-aromatic vinyl copolymer may be a linear polymer, a block polymer, a branched polymer, a ladder polymer, or a cross-linked polymer.

In the case of a block polymer, the block polymer may be any one of an A-B-type block polymer, an A-B-C-type block polymer, an A-B-A-type block polymer, or another type of block polymer.

Then, the (meth)acrylic ester polymer or the (meth)acrylic ester-aromatic vinyl copolymer is reacted with an imidization agent to perform an imidization reaction. In this way, the glutarimide acrylic resin can be produced.

The imidization agent is not particularly limited as long as the glutarimide unit represented by the above general formula (1) can be produced. More specifically, ammonia or a primary amine can be used. Examples of the primary amine include: aliphatic hydrocarbon group-containing primary amines such as methylamine, ethylamine, n-propylamine, i-propylamine, n-butylamine, i-butylamine, tert-butylamine, and n-hexylamine; aromatic hydrocarbon group-containing primary amines such as aniline, benzylamine, toluidine, and trichloroaniline; and alicyclic hydrocarbon group-containing primary amines such as cyclohexylamine.

The imidization agent may be a urea-based compound that generates ammonia or a primary amine by heating, and examples of such a compound include urea, 1,3-dimethyl urea, 1,3-diethyl urea, and 1,3-dipropyl urea.

Among these imidization agents, ammonia, methylamine, and cyclohexylamine are preferably used, and methylamine is particularly preferably used from the viewpoint of cost and physical properties.

In this imidization step, a ring-closing promoter may be added in addition to the imidization agent, if necessary.

In this imidization step, the glutarimide unit content of a resulting glutarimide acrylic resin can be adjusted by adjusting the ratio of the imidization agent added.

A method for performing the imidization reaction is not particularly limited, and a conventionally-known method can be used. For example, the imidization reaction is allowed to proceed by using an extruder or a batch-type reactor (pressure vessel).

The extruder is not particularly limited, and various extruders such as a single-screw extruder, a twin-screw extruder, and a multi-screw extruder can be used.

Among them, a twin-screw extruder is preferably used. The use of a twin-screw extruder makes it possible to promote mixing of the raw material polymer and the imidization agent (when a ring-closing promoter is used, mixing of the raw material polymer, the imidization agent, and the ring-closing agent).

Examples of the twin-screw extruder include a non-intermeshing co-rotating twin-screw extruder, an intermeshing co-rotating twin-screw extruder, a non-intermeshing counter-rotating twin-screw extruder, and an intermeshing counter-rotating twin-screw extruder. Among them, an intermeshing co-rotating twin-screw extruder is preferred. The screws of an intermeshing co-rotating twin-screw extruder can rotate at high speed, and therefore mixing of the raw material polymer and the imidization agent (when a ring-closing promoter is used, mixing of the raw material polymer, the imidization agent, and the ring-closing promoter) can be further promoted.

The above-mentioned extruders may be used singly or in combination of two or more of them serially connected.

The glutarimide acrylic resin production method may include, in addition to the above-described imidization step, an esterification step in which treatment using an esterification agent is performed. The esterification step makes it possible to convert carboxyl groups contained in the resin as a by-product of the imidization step to ester groups. This makes it possible to adjust the acid value of the glutarimide acrylic resin to a value within a desired range.

The acid value of the glutarimide acrylic resin is not particularly limited, but is preferably 0.50 mmol/g or less, more preferably 0.45 mmol/g or less. The lower limit of the acid value is not particularly limited, but is preferably 0 mmol/g or more, more preferably 0.05 mmol/g or more, particularly preferably 0.10 mmol/g or more. By setting the acid value to a value within the above range, the glutarimide acrylic resin can offer an excellent balance of heat resistance, mechanical properties, and molding processability. On the other hand, if the acid value exceeds the above upper limit, foaming of the resin is likely to occur during melt extrusion for film formation, which tends to deteriorate molding processability and to reduce molded article productivity. It is to be noted that the acid value can be calculated by, for example, a titration method described in JP-A-2005-23272.

The esterification agent is not particularly limited, and examples thereof include dimethyl carbonate, 2,2-dimethoxypropane, dimethylsulfoxide, tri ethyl orthoformate, trimethyl orthoacetate, trimethyl orthoformate, diphenyl carbonate, dimethyl sulfate, methyl toluene sulfonate, methyl trifluoromethyl sulfonate, methyl acetate, methanol, ethanol, methyl isocyanate, p-chlorophenyl isocyanate, dimethylcarbodiimide, dimethyl-t-butylsilylchloride, isopropenyl acetate, dimethyl urea, tetramethylammonium hydroxide, dimethyldiethoxysilane, tetra-N-butoxysilane, dimethyl (trimethylsilane) phosphite, trimethyl phosphite, trimethyl phosphate, tricresyl phosphate, diazomethane, ethylene oxide, propylene oxide, cyclohexene oxide, 2-ethylhexyl glycidyl ether, phenyl glycidyl ether, and benzyl glycidyl ether. Among them, dimethyl carbonate and trimethyl orthoacetate are preferred from the viewpoint of cost and reactivity, and dimethyl carbonate is particularly preferred from the viewpoint of cost.

The amount of the esterification agent to be used is not particularly limited, but is preferably 0 to 12 parts by weight, more preferably 0 to 8 parts by weight per 100 parts by weight of the (meth)acrylic ester polymer or the (meth)acrylic ester-aromatic vinyl copolymer. By setting the amount of the esterification agent to be used to a value within the above range, it is possible to adjust the acid value of the glutarimide acrylic resin to a value within an appropriate range. On the other hand, if the amount of the esterification agent to be used is not within the above range, there is a possibility that part of the esterification agent will remain unreacted in the resin, which may cause foaming or odor generation when molding is performed using the resin.

A catalyst may also be used in combination with the esterification agent. The type of catalyst to be used is not particularly limited, and examples of the catalyst include aliphatic tertiary amines such as trimethylamine, triethylamine, and tributylamine. Among them, triethylamine is preferred from the viewpoint of cost, reactivity, etc.

As in the case of the imidization step, the esterification step is allowed to proceed using, for example, an extruder or a batch-type reactor.

This esterification step may be performed only by heat treatment without using the esterification agent. The heat treatment can be achieved by kneading and dispersing the melted resin in an extruder. When only the heat treatment is performed as the esterification step, some or all of carboxyl groups contained in the resin as a by-product of the imidization step can be turned into acid anhydride groups by, for example, a dehydration reaction between carboxyl groups in the resin and/or a dealcoholization reaction between a carboxyl group in the resin and an alkyl ester group in the resin. At this time, a ring-closing promoter (catalyst) may also be used.

Even when the esterification step is performed using the esterification agent, conversion to acid anhydride groups by heat treatment can be allowed to proceed in parallel.

In both the imidization step and the esterification step, an extruder used is preferably equipped with a vent port so that the pressure in the extruder can be reduced to atmospheric pressure or less. The use of such a machine makes it possible to remove unreacted part of the imidization agent, unreacted part of the esterification agent, a by-product such as methanol, or monomers.

The glutarimide acrylic resin can also be appropriately produced using, instead of an extruder, a high-viscosity reaction apparatus such as a horizontal twin screw reaction apparatus, such as BIVOLAK manufactured by Sumitomo Heavy Industries, Ltd., or a vertical twin screw mixing vessel such as SUPER BLEND.

When the glutarimide acrylic resin is produced using a batch-type reactor (pressure vessel), the structure of the batch-type reactor (pressure vessel) is not particularly limited. More specifically, the batch-type reactor shall have a structure in which the raw material polymer can be melted by heating and stirred and the imidization agent (when a ring-closing promoter is used, the imidization agent and the ring-closing promoter) can be added, but preferably has a structure excellent in stirring efficiency. The use of such a batch-type reactor makes it possible to prevent insufficient stirring due to an increase in polymer viscosity with the progress of reaction. Examples of a batch-type reactor having such a structure include a mixing vessel MAX BLEND manufactured by Sumitomo Heavy Industries, Ltd. and the like.

In such a way as described above, the glutarimide acrylic resin whose glutarimide unit content is controlled to be a specific value can be easily produced.

When the maleimide acrylic resin and the glutarimide acrylic resin are used in combination, the maleimide acrylic resin content of the optical resin composition can be appropriately determined depending on desired physical properties of the optical resin composition. For example, the maleimide acrylic resin content of the optical resin composition is preferably 1 to 99 parts by weight per 100 parts by weight of the total amount of the maleimide acrylic resin and the glutarimide acrylic resin. The maleimide acrylic resin content is more preferably 1 to 80 parts by weight, even more preferably 5 to 70 parts by weight.

(Multistep-Polymerized Graft Copolymer or Multi-Layered Polymer (E))

The multistep-polymerized graft copolymer or the multi-layered polymer (E) used in the present invention is an essential component to allow the optical resin material to have high optical isotropy, because addition of the multistep-polymerized graft copolymer or the multi-layered polymer (E) to the thermoplastic resin as a matrix resin makes it possible to reduce both orientation birefringence and photoelastic constant. The multistep-polymerized graft copolymer is a polymer obtained by polymerizing a hard monomer mixture in the presence of cross-linked polymer-containing particles, and the multi-layered polymer is a polymer having a cross-linked polymer layer and a hard polymer layer. Both the polymers are basically identical, but the former is a polymer mainly identified by a production method, and the latter is a polymer mainly identified by a layer structure. The following description will be made mainly with reference to the latter, but apply equally to the former.

In order to allow the optical resin composition to have optical isotropy, how to reduce orientation birefringence and photoelastic birefringence is important. Therefore, the concepts of "orientation birefringence" and "photoelastic birefringence" of each of the thermoplastic resin, the polymer (E), the optical resin composition, and the film in the present invention will be first described below.

(Concept of Orientation Birefringence)

When a film is produced not by molding performed under such conditions that a polymer is oriented in a film, such as high discharge conditions, film drawing conditions, or low temperature conditions, but by normal melt extrusion molding, a polymer is not very highly oriented in the film. Actually, in the case of an acrylic resin typified by PMMA, its film formed by melt extrusion without intentionally subjected to a stretching process (hereinafter, also referred to as "original film" or "raw material film") does not have very high birefringence, and therefore can sometimes be practically used without problem depending on its intended use. Of course, when a film is formed by molding performed under such conditions that a polymer is oriented or an original film is subjected to a stretching process, a polymer is oriented in the film so that the film has birefringence. Such birefringence is due to polymer orientation, and is therefore generally called orientation birefringence. As described above, the orientation birefringence of a molded body, especially an optical film, made of the optical resin composition according to the present invention depends on how the optical resin composition according to the present invention is molded or, in the case of a film, whether the film is stretched or not. In order to reduce the orientation birefringence of the molded body, especially the optical film, it is necessary to set the orientation birefringence of the polymer (E) and the orientation birefringence of the thermoplastic resin. On the other hand, when polymer orientation hardly occurs in a molded body such as a film so that the birefringence of the molded body is sufficiently low, the orientation birefringence of the polymer (E) does not need to be greatly taken into consideration and is therefore not particularly limited when resin design is performed.

The measuring conditions of "orientation birefringence" in the present invention will be defined as follows. As described above, orientation birefringence develops due to orientation of polymer chains, but birefringence (orientation birefringence) in a polymer film varies depending on the degree of orientation of polymer chains. Therefore, in the present invention, "orientation birefringence" is measured under conditions defined as follows.

Each of the thermoplastic resin, the polymer (E), and the optical resin composition needs to be formed into a some form of molded body to measure its orientation birefringence. In the present invention, the molded body is defined as a film or sheet. Hereinbelow, the measurement of "orientation birefringence" will be described with reference to a case where the molded body is a melt-extrusion molded film or a press-molded sheet.

Measurement of "Orientation Birefringence" of Film

First, a test specimen of 25 mm×90 mm is cut out (so that its longitudinal direction is parallel to MD) from a film (original film) having a film thickness of 125 μm, both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in its longitudinal direction (at this time, both the long sides of the test specimen are not fixed). Thereafter, the thus obtained film is cooled to 23° C., and a sample is taken from the central portion of the film to measure birefringence.

Measurement of "Orientation Birefringence" of Sheet

When the polymer (E) has at least a cross-linked structure, it is difficult to form a film only from the polymer (E) depending on the structure of the polymer (E). In this case, the polymer (E) is formed into a sheet by press molding to measure "orientation birefringence". Also when it is difficult to form a film from, for example, the thermoplastic resin as in the case of the polymer (E), a sheet is formed by press molding to measure orientation birefringence.

Hereinbelow, the measuring conditions of "orientation birefringence" at the time when a sheet formed by press molding is used will be described.

The polymer (E) is pressed at 190° C. to prepare a press-molded sheet having a thickness of 500 μm. A test specimen of 25 mm×90 mm is cut out from the central portion of the obtained press-molded sheet, both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in its longitudinal direction (at this time, both the long sides of the test specimen are not fixed). Thereafter, the thus obtained film is cooled to 23° C., and a sample is taken from the central portion of the film to measure birefringence and determine the sign of orientation birefringence.

The above-described "orientation birefringence" depends on the degree of polymer orientation, and is therefore influenced by various sample preparation conditions including stretching conditions. For this reason, evaluation conditions have been specified above. For example, the stretching temperature is preferably in the range of −30° C. to +30° C. of the glass transition temperature, more preferably in the range of +0° C. to +30° C. of the glass transition temperature, and may be appropriately set to a temperature in the range of, for example, +5° C. to +30° C. of the glass transition temperature. However, in order to determine the sign of birefringence of each sample and to quantitatively determine the relative magnitude relationship between samples, it is important to use measurement values obtained under the almost same measuring conditions such as stretching conditions.

(Concept of Photoelastic Birefringence (Photoelastic Constant))

As has been described above, photoelastic birefringence is birefringence caused by elastic deformation (distortion) of a polymer in a molded body when stress is applied to the molded body. In fact, the intrinsic "photoelastic constant" of the polymer is determined, which makes it possible to evaluate the degree of photoelastic birefringence of the material. First, stress is applied to the polymer material and birefringence is measured when the polymer material is elastically distorted. A proportional constant between the obtained birefringence and the stress is defined as a photoelastic constant. The birefringences of polymers at the time when stress is applied to the polymers can be evaluated by comparing the photoelastic constants of the polymers.

As in the case of the above-described "orientation birefringence", each of the thermoplastic resin, the polymer (E), and the optical resin composition needs to be formed into a some form of molded body to measure its photoelastic birefringence. In the present invention, the molded body is defined as a film or sheet. Hereinbelow, the measurement of "orientation birefringence" will be described with reference to a case where the molded body is a melt-extrusion molded film or a press-molded sheet.

Measurement of "Photoelastic Constant" of Film

As in the case of the above-described "orientation birefringence", a strip-shaped test specimen of 15 mm×90 mm is cut out (so that its longitudinal direction is parallel to TD) from a film (original film) having a film thickness of 125 μm. Then, one of the long sides of the test specimen is fixed, and in this state, birefringence is measured at 23° C. while a load applied to the other long side is increased from 0 kgf to 4 kgf by 0.5-kgf increments. The magnitude of a change in birefringence per unit stress is calculated from the obtained result to determine a photoelastic constant.

Measurement of "Photoelastic Constant" of Sheet

As in the case of the above-described "orientation birefringence", the polymer (E) is formed into a sheet by press molding to measure its birefringence to determine a photoelastic constant. Also when it is difficult to form a film from, for example, the thermoplastic resin as in the case of the polymer (E), a sheet is formed by press molding to measure photoelastic birefringence.

Hereinbelow, measurement of "photoelastic constant" at the time when a press-molded sheet is used will be described.

The polymer (E) is pressed at 190° C. to prepare a press-molded sheet having a thickness of 500 μm. Then, a test specimen of 25 mm×90 mm is cut out from the central portion of the obtained press-molded sheet. The measuring conditions and calculation method of "photoelastic constant" are the same as those used in the case of the above-described melt-extrusion molded film.

When there is a large difference in thickness between samples to be compared in the measurement of photoelastic birefringences of films and/or sheets, there is a possibility that the samples are different from each other in how stress is applied, and therefore there is a case where it is difficult to strictly compare photoelastic constants between the samples. However, there is not a large difference in how stress is applied between the sample of the film having a thickness of 125 μm and the sample of the press-molded sheet having a thickness of 500 μm described in the present invention, and therefore it is possible to compare photoelastic constants between samples when a difference in thickness between the samples is at such a level as described above. Therefore, both the above-described film and press-molded sheet can be appropriately used to measure a photoelastic constant (birefringence), but the film is preferably used. In the present invention, a press-molded sheet having a thickness of 500 μm is used as a means for determining the sign of photoelastic constant of the polymer (E). The same applies to orientation birefringence.

The photoelastic birefringence of a polymer is a property intrinsic to the structure of the polymer, and therefore when the photoelastic constant of the thermoplastic resin is large, the photoelastic constant of the polymer (E) needs to be opposite in sign to the photoelastic constant of the thermoplastic resin. Further, the polymer (E) needs to be added in such an amount that the photoelastic birefringence of the thermoplastic resin can be cancelled out. It is known that additivity is established between the photoelastic constant of a resulting polymer (copolymer) and the photoelastic constants of homopolymers corresponding to monomer species used for copolymerization. Therefore, when the photoelastic constant of the polymer (E) is opposite in sign to the photoelastic constant of the thermoplastic resin and is larger, the amount of the polymer (E) that needs to be added to reduce the photoelastic birefringence of the optical resin composition composed of the thermoplastic resin and the polymer (E) and the photoelastic birefringence of the film thereof can be made smaller. Further, when two kinds of the thermoplastic resins opposite in sign of photoelastic birefringence are used, the photoelastic constant of an alloy of the thermoplastic resins can be reduced, and therefore the amount of the polymer (E) that needs to be added to reduce photoelastic birefringence can be made much smaller.

As for orientation birefringence, as described above, when the degree of polymer orientation in a molded body, especially an optical film, made of the optical resin composition according to the present invention is not so high and therefore the orientation birefringence of the molded body does not become a problem when the molded body is practically used, it is not particularly necessary to take the orientation birefringence of the polymer (E) into consideration when the polymer (E) is designed. However when the orientation birefringence of the resulting molded body becomes a problem when the molded body is practically used, the orientation birefringence of the polymer (E) needs to be made opposite in sign to the orientation birefringence of the thermoplastic resin.

The above-described technical idea is important to reduce birefringence to provide the optical resin composition and film according to the present invention.

The polymer (E) used in the present invention shall be a polymer having a weight-average molecular weight exceeding 5000, preferably 10000 or more, more preferably 20000 or more. If the weight-average molecular weight is 5000 or less, there is a fear that the physical properties, such as mechanical properties, heat resistance, and hardness, of a resulting molded body are deteriorated or the appearance of a resulting molded body is impaired due to bleeding out on the surface of the molded body during high-temperature molding processing.

The polymer (E) is a multi-layered polymer having a cross-linked polymer layer, and therefore the mechanical strength of the optical resin composition can be improved. From the viewpoint of heat resistance, the polymer (E) preferably has a hard polymer layer. Such a multi-layered polymer is generally also referred to as a graft copolymer or a core-shell polymer, and the polymer (E) used in the present invention includes these polymers.

In U.S. Pat. No. 4,373,065, the two kinds of polymers are very different in structure, and are therefore basically less likely to be completely miscible with each other. In fact, when the two kinds of non-crosslinked polymers are blended, one of the polymers aggregates so that micron-sized domains or clearly-visible large clusters and then surface irregularities are formed, which impairs transparency or causes defects such as fish-eyes. Therefore, in order to allow two kinds of polymers to be easily completely miscible with each other, polymer design needs to be performed in consideration of two factors of birefringence control and miscibility control, which significantly reduces the degree of freedom of polymer design. Under the circumstances, the polymer (E) used in the present invention exhibits its characteristics. In the present invention, when the polymer (E) has a cross-linked polymer layer and a hard polymer layer and is designed so that each microparticle of the polymer(E) has a submicron size, a blend of the thermoplastic resin and the polymer (E) has a sea-island structure in which submicron-sized microparticles of the polymer (E) are dispersed in the thermoplastic resin as a matrix, and therefore the polymer (E) is less likely to endlessly aggregate to form clusters of several millimeters or centimeters that impair transparency or cause defects such as fish-eyes. As described above, the polymer (E) is previously designed to have a submicron size so that the dispersibility of the polymer (E) in the matrix can be controlled, and therefore the polymer (E) can be dispersed in the matrix even when the thermoplastic resin and the polymer (E) are not completely miscible with each other. This increases the degree of freedom of polymer design of both the thermoplastic resin as a matrix and the polymer (E). For example, importance can be imposed on birefringence control when polymer design is performed. This is the second important technical idea.

Hereinbelow, the third important technical idea of the present invention will be described. There is a case where a molded body, especially an optical film, made of the optical resin composition according to the present invention needs to have high heat resistance and mechanical strength. Particularly, when used as an optical film for liquid crystal displays, the molded body needs to have high heat resistance, because it is exposed to high temperature when subjected to a film coating process or the like during production as well as when practically used. Further, the molded body needs to have also mechanical strength such as trimming property or crack resistance, because a punching process or the like is performed after film coating or bonding to another member as well as during film production. In this case, addition of the polymer (E) whose cross-linked polymer layer is "soft" to the thermoplastic resin as a matrix makes it possible to significantly improve mechanical strength and achieve high heat resistance at the same time. In order to obtain such an effect, the polymer (E) is preferably a graft copolymer (core-shell polymer) having a soft cross-linked polymer layer and a hard polymer layer. Usually, addition of a soft polymer is performed as one of the ways to improve mechanical strength, but in this case, a matrix resin (in this case, the thermoplastic resin) and the soft polymer are uniformly mixed, which is disadvantageous in that a resulting molded body has low heat resistance. On the other hand, when the polymer (E) is a graft copolymer (core-shell polymer) having a soft cross-linked polymer layer and a hard polymer layer, a resulting molded body has a discontinuous sea-island structure in which the soft cross-linked polymer layer is "island" and the thermoplastic resin and the hard polymer layer are "sea", and therefore it is possible to obtain an excellent effect that mechanical strength is improved and heat resistance is hardly reduced. Usually, a soft cross-linked polymer is different in composition from a matrix (thermoplastic resin), and therefore it is difficult to uniformly disperse the soft cross-linked polymer in the matrix, which deteriorates optical characteristics such as transparency or causes defects such as fish-eyes. However, as described above, when the polymer (E) is a graft copolymer having both a soft cross-linked polymer layer and a hard polymer layer, it is possible to uniformly disperse the soft cross-linked polymer in the matrix.

The term "soft" used herein means that the glass transition temperature of the polymer is lower than 20° C. From the viewpoint of enhancing the impact absorption capacity of the soft layer and enhancing an impact resistance improving effect such as crack resistance, the glass transition temperature of the polymer is preferably lower than 0° C., more preferably lower than −20° C.

Further, the term "hard" used herein means that the glass transition temperature of the polymer is 20° C. or higher. If the glass transition temperature of the polymer is lower than 20° C., the optical resin composition and the film that contain the polymer (E) have low heat resistance or there is a problem that coarsening or agglomeration of the polymer (E) is likely to occur during production of the polymer (E).

In this specification, the glass transition temperature of the "soft" or "hard" polymer is calculated by Fox equation using a value described in Polymer Hand Book (J. Brandrup, Interscience 1989) (for example, the glass transition temperature of polymethyl methacrylate is 105° C. and the glass transition temperature of polybutyl acrylate is −54° C.).

When a molded body and a film that are made of the optical resin composition according to the present invention do not need to have very high mechanical strength, the cross-linked polymer layer may be either "soft" or "hard", and the definition of "soft" or "hard" is the same as that described above.

In this specification, a graft ratio is used as a parameter to express the degree of covalent bonding of the hard polymer layer to the cross-linked polymer layer in the polymer (E).

The graft ratio of the polymer (E) is an index representing the weight ratio of the grafted hard polymer layer to the cross-linked polymer layer when the weight of the cross-linked polymer layer is regarded as 100. The graft ratio is preferably 10 to 250%, more preferably 40 to 230%, most preferably 60 to 220%. If the graft ratio is less than 10%, the polymer (E) is likely to aggregate in a resulting molded body so that there is a fear that transparency is impaired or defects are caused by foreign matter. Further, the tensile elongation at breakage of the film is reduced so that cracking is likely to occur when the film is cut. If the graft ratio is 250% or higher, the melt viscosity of the optical resin composition during molding, for example during film formation, increases, which tends to deteriorate film formability. The calculation formula of the graft ratio will be described later in the section of Examples.

It is to be noted that there is a case where part of the hard polymer layer is not bonded (grafted) to the cross-linked polymer layer (also referred to as free polymer), but this free polymer is also included in the polymer (E).

(Description of Cross-Linked Polymer Layer)

Hereinbelow, the cross-linked polymer layer will be described with reference to a case where the polymer (E) is a graft copolymer.

1. Description of "Soft" Cross-Linked Polymer Layer

First, the "soft" cross-linked polymer layer will be described.

The "soft" cross-linked polymer layer has the functions of (1) uniformly dispersing in the thermoplastic resin to improve mechanical strength such as crack resistance and (2) cancelling out the birefringence of the thermoplastic resin to enhance the optical isotropy of the optical resin composition and the film according to the present invention.

The function (1) can be achieved by polymerizing a monomer appropriately selected so that a glass transition temperature is lower than 20° C. As described above, rubber obtained by polymerizing an acrylic monomer, that is, acrylic rubber is preferred.

The function (2) will be described with reference to orientation birefringence. This time, the present inventors have found that when the film according to the present invention is stretched (while heat is applied), not only the thermoplastic resin as a matrix resin but also the above-described "soft" cross-linked polymer are oriented so that orientation birefringence occurs. The frequency of occurrence of orientation birefringence of the cross-linked polymer depends not only on the polymer composition of the cross-linked polymer but also on the degree of cross-linking. When the degree of cross-linking is high, the copolymer is less likely to be deformed (oriented) so that orientation birefringence is less likely to occur even when being stretched. On the other hand, when the degree of cross-linking is low, the cross-linked polymer is likely to be oriented by stretching so that orientation birefringence occurs. In either case, the orientation birefringence of a polymer composition constituting the cross-linked polymer needs to be taken into consideration in order to reduce the orientation birefringence of a stretched film. As concrete measures, it is important to design the polymer composition of the cross-linked polymer so that the orientation birefringence of the cross-linked polymer is opposite in sign to that of the thermoplastic resin.

However, there is one more important point that should be taken into consideration when the polymer composition is designed. In order to allow the film to develop very excellent transparency even after stretching, it is important to adjust the refractive index of the cross-linked polymer layer to that of the thermoplastic resin as a matrix.

A monomer will be mentioned which is suitable for taking the above-described points into consideration, that is, for significantly reducing the orientation birefringence of the film after stretching and for developing high transparency. When the thermoplastic resin as a matrix is an acrylic resin, the orientation birefringence of the cross-linked polymer needs to be positive that is opposite to the sign of the orientation birefringence of the acrylic resin, because the orientation birefringence of the acrylic resin is negative. It has been described that acrylic rubber is suitable for making the cross-linked polymer layer "soft", but a high refractive index monomer is preferably used for the cross-linked polymer layer, because the refractive index of a polymer composition generally used for acrylic rubber is lower than that of the acrylic resin as a matrix.

On the other hand, the effect of the cross-linked polymer on photoelastic birefringence will also be described. The cross-linked polymer is less likely to be deformed by the application of a certain stress than by hot stretching, and therefore the photoelastic birefringence of the cross-linked polymer contributes less to photoelastic birefringence. When the degree of cross-linking is low, the photoelastic birefringence of the cross-linked polymer is likely to contribute to photoelastic birefringence. However, the photoelastic birefringence of the cross-linked polymer does not need to be highly considered as compared to the effect of the cross-linked polymer on orientation birefringence caused by stretching.

From the above points of view, the cross-linked polymer layer used in the present invention is formed by polymerizing a monomer mixture containing a monomer represented by the following general formula (4) and/or an aromatic group-containing vinyl-based monomer and a polyfunctional monomer,

[Chemical Formula 12]

$$CH_2=C \begin{array}{c} R^9 \\ | \\ \end{array} \atop \underset{O}{\overset{\|}{C}} -O-(CH_2)_l-(O)_m \underset{n}{)}-R^{10} \qquad (4)$$

wherein $R^9$ is a hydrogen atom or a substituted or unsubstituted linear or branched alkyl group having 1 to 12 carbon atoms, and $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, A substituent group that $R^9$ and $R^{10}$ may have is, for example, at least one selected from the group consisting of a halogen, a hydroxyl group, a carboxyl group, an alkoxy group, a carbonyl group (ketone structure), an amino group, an amide group, an epoxy group, a carbon-carbon double bond, an ester group (derivative of carboxyl group), a mercapto group, a sulfonyl group, a sulfone group, and a nitro group. Particularly, at least one selected from the group consisting of a halogen, a hydroxyl group, a carboxyl group, an alkoxy group, and a nitro group is preferred. In the above formula (4), l is an integer of 1 to 4, preferably an integer of 1 or 2, m is an integer of 0 or 1, and n is an integer of 0 to 10, preferably an integer of 0 to 2, more preferably an integer of 0 or 1.

The monomer represented by the formula (4) is preferably a (meth)acrylic monomer represented by the formula (4) wherein $R^9$ is a hydrogen atom or a substituted or unsubstituted alkyl group having 1 carbon atom. The (meth)acrylic monomer is more preferably one represented by the formula (4) wherein $R^{10}$ is a substituted or unsubstituted aromatic group having 1 to 24 carbon atoms or a substituted or unsubstituted alicyclic group having 1 to 24 carbon atoms and has a homocyclic structure.

The (meth)acrylic monomer is more preferably one represented by the formula (4) wherein l is an integer of 1 or 2 and n is an integer of 0 to 2.

Specific examples of the monomer having an alicyclic group include dicyclopentanyl (meth)acrylate and dicyclopentenyloxyethyl (meth)acrylate. Specific examples of the monomer having an aromatic group include benzyl (meth)acrylate, phenyl (meth)acrylate, and phenoxyethyl (meth)acrylate. Examples of the monomer having a heterocyclic structure include pentamethylpiperidinyl (meth)acrylate, tetramethylpiperidinyl (meth)acrylate, and tetrahydrofurfuryl (meth)acrylate.

Among (meth)acrylic monomers represented by the formula (4), benzyl (meth)acrylate, dicyclopentanyl (meth)acrylate, and phenoxyethyl (meth)acrylate are preferred from the viewpoint of orientation birefringence and transparency. Among monomers represented by the above formula (4), benzyl (meth)acrylate is most preferred from the viewpoint of optical isotropy, cancelling out the orientation birefringence of the thermoplastic resin to reduce orientation birefringence, and transparency. Particularly, when the heat resistance is desired to be high, benzyl methacrylate is preferred for its higher glass transition temperature. On the other hand, when the development of strength is required, benzyl acrylate is preferred for its lower glass transition temperature. For example, when the thermoplastic resin is an acrylic resin, the acrylic resin has a negative orientation birefringence, and therefore the use of benzyl methacrylate having a relatively large positive photoelastic constant has merits that the amount of benzyl methacrylate to be used can be reduced or the amount of the polymer (E) to be used can be reduced and that the degree of freedom of design of the optical resin composition can be increased. When the cross-linked polymer has a low degree of cross-linking and therefore develops photoelastic birefringence, the photoelastic birefringence of the optical resin composition or the film can be reduced while the orientation birefringence of the optical resin composition or the film is also reduced, because the orientation birefringence and photoelastic birefringence of the acrylic resin are both negative whereas the orientation birefringence and photoelastic birefringence of benzyl methacrylate are both positive.

Examples of the aromatic group-containing vinyl-based monomer include styrene, chlorostyrene, dichlorostyrene, fluorostyrene, difluorostyrene, bromostyrene, dibromostyrene, methoxystyrene, tertiary butoxystyrene, vinyl benzoic acid, methyl-α-methylstyrene, α-methylstyrene, vinyl toluene, vinyl biphenyl, and vinyl naphthalene. From the viewpoint of transparency, styrene and/or a derivative thereof is preferred, and styrene is more preferred.

The cross-linked polymer layer used in the present invention is formed by polymerizing a monomer mixture containing a monomer represented by the following general formula (4) and/or an aromatic group-containing vinyl-based monomer and a polyfunctional monomer. When the monomer represented by the above general formula (4) is contained, excellent orientation birefringence can be achieved.

From the viewpoint of developing mechanical strength while maintaining excellent optical isotropy, the cross-linked polymer layer having, as a structural unit(s), the monomer represented by the formula (4) and/or the aromatic group-containing vinyl-based monomer is preferably one obtained by polymerizing 1 to 100 wt % of the monomer represented by the above formula (4) and/or the aromatic group-containing vinyl-based monomer, 99 to 0 wt % of another monofunctional monomer copolymerizable therewith, and 0.05 to 10 parts by weight of a polyfunctional monomer (per 100 parts by weight of the total amount of the monomer represented by the above formula (4) and/or the aromatic group-containing vinyl-based monomer and another monofunctional monomer copolymerizable therewith). The amount of the monomer represented by the above formula (4) and/or the aromatic group-containing vinyl-based monomer to be used is preferably 1 to 100 wt %, more preferably 5 to 70 wt %, most preferably 5 to 50 wt % per 100 wt % of the total amount of the monomer represented by the above formula (4) and/or the aromatic group-containing vinyl-based monomer and another monofunctional monomer copolymerizable therewith. If the amount of the polyfunctional monomer to be added is less than 0.05 part by weight, a cross-linked polymer is less likely to be formed. On the other hand, if the amount of the polyfunctional monomer to be added exceeds 10 parts by weight, a resulting film tends to have low crack resistance. The amount of the polyfunctional monomer to be added is preferably 0.1 to 5 parts by weight. The cross-linked polymer layer may be one obtained by one-step polymerization performed by mixing all the monomers or one obtained by polymerization performed in two or more steps by changing the composition of monomers.

In the present invention, any one of benzyl methacrylate, benzyl acrylate, dicyclopentanyl (meth)acrylate, and phenoxyethyl (meth)acrylate can be preferably used as the monomer represented by the above formula (4), and these monomers may be used singly or in combination of two or more of them. When the optical resin composition or the film is used in applications requiring higher heat resistance, benzyl methacrylate is more preferably used from the viewpoint of glass transition temperature.

As an example of the another monofunctional monomer copolymerizable with the monomer represented by the above formula (4) and/or the aromatic group-containing vinyl-based monomer, methacrylic ester can be mentioned. From the viewpoint of polymerizability and cost, the methacrylic ester is preferably alkyl methacrylate. More specifically, the alkyl methacrylate is preferably one whose alkyl group has 1 to 12 carbon atoms, and the alkyl group may be linear or branched. Specific examples of the alkyl methacrylate include methyl methacrylate, ethyl methacrylate, propyl methacrylate, butyl methacrylate, 2-ethylhexyl methacrylate, octyl acrylate, β-hydroxyethyl methacrylate, dimethylaminoethyl methacrylate, and glycidyl methacrylate. Further, acrylic ester may also be preferably used. From the viewpoint of polymerization reactivity and cost, the acrylic ester is preferably alkyl acrylate. More specifically, the alkyl acrylate is preferably one whose alkyl group has 1 to 12 carbon atoms, and the alkyl group may be either linear or branched. Specific examples of the alkyl acrylate include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, and glycidyl acrylate. Other examples of the another copolymerizable monofunctional monomer include: unsubstituted and/or substituted maleic anhydrides such as malic anhydride, citraconic anhydride, dimethyl maleic anhydride, dichloromaleic anhydride, bromomaleic anhydride, dibromomaleic anhydride, phenylmaleic anhydride, and diphenylmaleic anhydride; vinyl halides such as vinyl chloride and vinyl bromide; (meth)acrylamides such as acrylamide, methacrylamide, and N-methylolacrylamide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; methacrylic acid and salts thereof such as methacrylic acid, sodium methacrylate, and calcium methacrylate; and (hydroxyalkyl)acrylates such as methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and tertiary butyl 2-(hydroxymethyl)acrylate. These monomers may be used singly or in combination of two or more of them. Among them, methacrylic ester and acrylic ester are preferred, and acrylic ester is more preferred for its low glass transition temperature and excellent mechanical strength. Particularly, n-butyl acrylate and 2-ethylhexyl acrylate are preferred, and n-butyl acrylate is most preferred. The polymer (E) used in the present invention may have one or more cross-linked polymer layers different from the above-described cross-linked polymer layer.

(Description of Hard Polymer Layer)

As described above, the "hard" polymer that forms the hard polymer layer needs to have the functions of (1) uniformly dispersing the polymer (E) in the matrix (thermoplastic resin) and (2) cancelling out the birefringence of the thermoplastic resin to improve the optical isotropy of the optical resin composition and the film according to the present invention.

The function (1) can be achieved by forming a polymer easily compatible with the matrix component by polymerization of a monomer appropriately selected.

When the orientation birefringence of a molded body such as a film is not so high and therefore does not become a problem, such as when a molded body is not subjected to a stretching process, the function (2) can be achieved by allowing the photoelastic constant of the hard polymer to be opposite in sign to that of the matrix (thermoplastic resin) so that the molded body has a very small photoelastic constant. On the other hand, when the orientation birefringence of a molded body such as a film is relatively large and therefore becomes a problem, such as when a molded body is subjected to a stretching process, the function (2) can be achieved by allowing both the photoelastic constant and orientation birefringence of the hard polymer to be opposite in sign to those of the matrix (thermoplastic resin) so that not only the photoelastic constant of the molded body but also the orientation birefringence of the molded body is very low.

What is more important to achieve the function (2) is that the "hard" polymer layer is more effective than the polymer layer having a cross-linked structure at cancelling out the birefringence of the thermoplastic resin as a matrix. Any one or more of the layers of the polymer (E), for example one or both of the cross-linked polymer layer and the hard polymer layer of the polymer (E), may have the function of cancelling out the birefringence of the thermoplastic resin, but the "hard" polymer layer is most preferred. The reason for this is considered to be that when polymer orientation occurs during molding of the matrix (thermoplastic resin) or polymer orientation occurs by the application of stress to the matrix, the birefringence of the matrix can be cancelled out by orienting the polymer chains of the polymer (E) in a direction in which the polymer chains of the matrix are oriented by external force. In this case, the polymer layer having a cross-linked structure is less likely to be deformed by external force and therefore polymer chains are less likely to be oriented, that is, the polymer layer having a cross-linked structure is less effective at cancelling out the birefringence of the matrix. Of course, when the crosslink density of the polymer layer having a cross-linked structure is low, the polymer layer having a cross-linked structure is likely to be deformed by external force, and therefore the polymer layer having a cross-linked structure is also expected to be effective to some extent at cancelling out the birefringence of the matrix. For this reason, any of the polymer layers, including the cross-linked polymer layer, of the graft copolymer may have the function of cancelling out the birefringence of the matrix, but the polymer layer other than the cross-linked polymer layer or the polymer layer in which polymer chains can be oriented by external force is preferred, and more specifically the "hard" polymer layer is preferred. The "hard" polymer layer having no cross-linked structure is more preferred, and the "hard" polymer layer that is present as an outer layer of the polymer (E) so as to easily come into direct contact with the matrix and that has no cross-linked structure is even more preferred.

Hereinbelow, a description will be made with reference to a case where an outer layer of the polymer (E) is the "hard" polymer layer that is highly effective at cancelling out the birefringence of the thermoplastic resin to improve the optical isotropy of the optical resin composition and the film according to the present invention.

A monomer species that is used for forming the hard polymer layer of the polymer (E) and is suitable for cancelling out the photoelastic birefringence of the thermoplastic resin shall be selected so that the photoelastic constant of the thermoplastic resin and the photoelastic constant of the polymer (E) are opposite in sign to each other.

Specific examples of a monomer are given below as a reference for setting the photoelastic constant of a polymer, but the monomer species is not limited thereto. (a value within [ ] represents the photoelastic constant of its homopolymer)

Monomers showing positive photoelastic birefringence:
Benzyl methacrylate [$48.4 \times 10^{-12}$ Pa$^{-1}$]
Dicyclopentanyl methacrylate [$6.7 \times 10^{-12}$ Pa$^{-1}$]
Styrene [$10.1 \times 10^{-12}$ Pa$^{-1}$]
Parachlorostyrene [$29.0 \times 10^{-12}$ Pa$^{-1}$]

Monomers showing negative photoelastic birefringence:
Methyl methacrylate [$-4.3 \times 10^{-12}$ Pa$^{-1}$]
2,2,2-trifluoroethyl methacrylate [$-1.7 \times 10^{-12}$ Pa$^{-1}$]
2,2,2-trichloroethyl methacrylate [$-10.2 \times 10^{-12}$ Pa$^{-1}$]
Isobornyl methacrylate [$-5.8 \times 10^{-12}$ Pa$^{-1}$]

It is known that additivity is established between the photoelastic constant of a copolymer and the photoelastic constants of homopolymers corresponding to monomer species used for copolymerization. For example, it has been reported that in the case of a binary copolymerization system of methyl methacrylate (MMA) and benzyl methacrylate (BzMA), its photoelastic birefringence becomes substantially zero when the ratio of poly-MMA/BzMA is 92/8 (wt %). The same applies to a mixture (alloy) of two or more polymers, that is, additivity is established between the photoelastic constant of a polymer mixture and the photoelastic constants of polymers. This is why it is necessary to allow the photoelastic constant of the thermoplastic resin and the photoelastic constant of the polymer (E) to be opposite in sign and to adjust the amounts (wt %) of the thermoplastic resin and the polymer (E) to be blended to reduce the photoelastic birefringences of the optical resin composition and the film according to the present invention.

Further, it is known that additivity is established between the orientation birefringence of a copolymer and the intrinsic birefringences of homopolymers corresponding to monomer species used for copolymerization. The same applies to a mixture (alloy) of two or more polymers, that is, additivity is established between the orientation birefringence of a polymer mixture and the intrinsic birefringences of polymers. A monomer species that is used for forming the hard polymer layer of the polymer (E) and is suitable for cancelling out the orientation birefringence of the thermoplastic resin shall be selected so that the orientation birefringence of the thermoplastic resin and the orientation birefringence of the polymer (E) are opposite in sign to each other. Specific examples of a monomer are given below as a reference for setting the orientation birefringence of a polymer (the intrinsic birefringence of a homopolymer consisting of the monomer), but the monomer species is not limited thereto. It is to be noted that the term "intrinsic birefringence" refers to birefringence (orientation birefringence) when a polymer is completely oriented in one direction.

Polymers showing positive intrinsic birefringence:
Polybenzyl methacrylate [+0.002]
Polyphenylene oxide [+0.210]
Bisphenol A polycarbonate [+0.106]
Polyvinyl chloride [+0.027]
Polyethylene terephthalate [+0.105]
Polyethylene [+0.044]

Polymers showing negative intrinsic birefringence:
Polymethyl methacrylate [−0.0043]
Polystyrene [−0.100]

Although the data of photoelastic constants and orientation birefringences of some polymers is shown above, both the birefringences are not always the same in sign depending on the type of polymer. For example, some polymers have a "positive" orientation birefringence and a "negative" photoelastic constant. The signs of the orientation birefringence and photoelastic birefringence (constant) of some homopolymers are shown in the following Table 1 as examples.

TABLE 1

| Homopolymer | Sign of orientation birefringence | Sign of photoelastic constant |
| --- | --- | --- |
| Polymethyl methacrylate (MMA) | Negative | Negative |
| Poly(2,2,2-trifluoroethyl methacrylate) (3FMA) | Positive | Negative |
| Polybenzyl methacrylate (BzMA) | Positive | Positive |

For example, it is known that the orientation birefringence of a poly(MMA/BzMA) copolymer having a composition of around 82/18 (wt %) is substantially zero and that the photoelastic birefringence (constant) of a poly(MMA/BzMA) copolymer having a composition of around 92/8 (wt %) is substantially zero. As shown above, when the thermoplastic resin is an acrylic resin, both the orientation birefringence and the photoelastic constant thereof are often negative, and therefore benzyl methacrylate whose orientation birefringence and photoelastic birefringence are both positive is suitable for use in the polymer (E) (especially, in the hard polymer layer that is the outer layer of the polymer (E)) because the orientation birefringence of the thermoplastic resin can be cancelled out while the photoelastic birefringence of the thermoplastic resin is also cancelled out.

Hereinbelow, the polymer composition of the hard polymer layer will be described in detail.

From the viewpoint of cancelling out the photoelastic birefringence and, if necessary, orientation birefringence of the thermoplastic resin as a matrix and from the viewpoint of improving mechanical strength and heat resistance and improving dispersibility of the polymer (E) in the thermoplastic resin (i.e., compatibility) to reduce appearance defects such as fish-eyes, the hard polymer layer preferably contains, as a structural unit, a monomer represented by the above formula (4). The monomer represented by the above formula (4) used to form the hard polymer layer may be the same as or different from the monomer represented by the formula (4) used to form the cross-linked polymer layer.

The monomer represented by the formula (4) is preferably a (meth)acrylic monomer represented by the formula (4) wherein $R^9$ is a hydrogen atom or a substituted or unsubstituted alkyl group having 1 carbon atom. The (meth)acrylic monomer is more preferably one represented by the formula (4) wherein $R^{10}$ is a substituted or unsubstituted aromatic group having 1 to 24 carbon atoms or a substituted or unsubstituted alicyclic group having 1 to 24 carbon atoms and has a homocyclic structure.

The (meth)acrylic monomer is more preferably one represented by the formula (4) wherein 1 is an integer of 1 or 2 and n is an integer of 0 to 2.

Among (meth)acrylic monomers represented by the formula (4), benzyl (meth)acrylate, dicyclopentanyl (meth)acrylate, and phenoxyethyl (meth)acrylate are preferred.

Among these monomers represented by the formula (4), benzyl (meth)acrylate is most preferred in terms of optical isotropy, compatibility with the thermoplastic resin, and moldability. Further, benzyl methacrylate has a higher glass transition temperature and is therefore more preferred in terms of heat resistance. For example, when the thermoplastic resin is an acrylic resin, the acrylic resin has a negative photoelastic constant, and therefore the use of benzyl methacrylate having a relatively large positive photoelastic constant has merits that the amount of benzyl methacrylate to be used can be reduced or the amount of the polymer (E) to be used can be reduced and that the degree of freedom of design of the optical resin composition can be increased. Although there is a case where high orientation birefringence of a molded body becomes a problem when the molded body is practically used, the orientation birefringence and photoelastic birefringence of benzyl methacrylate are both positive whereas the orientation birefringence and photoelastic birefringence of the acrylic resin are both negative, and therefore the orientation birefringence of the optical resin composition or the film can be reduced while the photoelastic birefringence of the optical resin composition or the film is also reduced.

From the viewpoint of achieving excellent dispersibility of the polymer (E) to reduce appearance defects such as fish-eyes while maintaining excellent optical isotropy, the hard polymer layer having, as a structural unit, the monomer represented by the above formula (4) is preferably one obtained by polymerization of 1 to 99 wt % of the monomer represented by the above formula (4), 99 to 1 wt % of another monofunctional monomer copolymerizable therewith, and 0 to 2.0 parts by weight of a polyfunctional monomer (per 100 parts by weight of the total amount of the monomer represented by the above formula (4) and the another monofunctional monomer copolymerizable therewith). The hard polymer layer may be one obtained by one-step polymerization performed by mixing all the monomers or one obtained by polymerization performed in two or more steps by changing the composition of monomers.

In the present invention, any one of benzyl methacrylate, benzyl acrylate, dicyclopentanyl (meth)acrylate, and phenoxyethyl (meth)acrylate can be preferably used as the monomer represented by the above formula (4), and these monomers may be used singly or in combination of two or more of them. When the optical resin composition or the film is used in applications requiring higher heat resistance, benzyl methacrylate is more preferably used from the viewpoint of glass transition temperature.

As an example of the another monofunctional monomer copolymerizable with the monomer represented by the above formula (4), methacrylic ester can be mentioned. From the viewpoint of polymerizability and cost, the methacrylic ester is preferably alkyl methacrylate. More specifically, the alkyl methacrylate is preferably one whose alkyl group has 1 to 12 carbon atoms, and the alkyl group may be linear or branched. Specific examples of the alkyl methacrylate include methyl methacrylate, ethyl methacrylate, propyl methacrylate, butyl methacrylate, 2-ethylhexyl methacrylate, octyl acrylate, β-hydroxyethyl methacrylate, dimethylaminoethyl methacrylate, and glycidyl methacrylate. Further, acrylic ester may also be preferably used. From the viewpoint of polymerization reactivity and cost, the acrylic ester is preferably alkyl acrylate. More specifically, the alkyl acrylate is preferably one whose alkyl group has 1 to 12 carbon atoms, and the alkyl group may be either linear or branched. Specific examples of the alkyl acrylate include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, and glycidyl acrylate. Other examples of the another copolymerizable monofunctional monomer include: unsubstituted and/or substituted maleic anhydrides such as malic anhydride, citraconic anhydride, dimethyl maleic anhydride, dichloromaleic anhydride, bromomaleic anhydride, dibromomaleic anhydride, phenylmaleic anhydride, and diphenylmaleic anhydride; vinyl halides such as vinyl chloride and vinyl bromide; (meth)acrylamides such as acrylamide, methacrylamide, and N-methylolacrylamide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; methacrylic acid and salts thereof such as methacrylic acid, sodium methacrylate, and calcium methacrylate; and (hydroxyalkyl)acrylates such as methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and tertiary butyl 2-(hydroxymethyl)acrylate. These monomers may be used singly or in combination of two or more of them. Particularly, methacrylic ester and/or acrylic ester are/is preferably contained, and alkyl methacrylate and/or alkyl acrylate are/is more preferably contained. From the viewpoint of compatibility with the acrylic thermoplastic resin, methyl methacrylate is preferably used. From the viewpoint of suppressing zipper depolymerization, methyl acrylate, ethyl acrylate, or n-butyl acrylate is preferably used. For this reason, methacrylic ester and acrylic ester are more preferably contained. The amount of the methacrylic ester contained is preferably 0 to 98 wt %, more preferably 0.1 to 98 wt %, even more preferably 1 to 94 wt %, particularly preferably 30 to 90 wt % per 100 wt % of the total amount of the monomer represented by the above formula (4) and the another monofunctional monomer copolymerizable therewith. The amount of the acrylic ester contained is preferably 0 to 98 wt %, more preferably 0.1 to 98 wt %, even more preferably 1 to 50 wt %, particularly preferably 5 to 50 wt % per 100 wt % of the total amount of the monomer represented by the above formula (4) and the another monofunctional monomer copolymerizable therewith.

The amount of the monomer represented by the above formula (4) to be used is preferably 1 to 99 wt %, more preferably 5 to 70 wt %, most preferably 5 to 50 wt % per 100 wt % of the total amount of the monomer represented by the above formula (4) and the another monofunctional monomer copolymerizable therewith.

From the viewpoint of improving heat stability during molding processing, solvent resistance, and dispersibility of the polymer (E), (meth)acrylic acid and/or a salt thereof are/is preferably used. Examples of the salt of (meth)acrylic acid include sodium (meth)acrylate, calcium (meth)acrylate, magnesium (meth)acrylate, and ammonium (meth)acrylate.

When (meth)acrylic acid and/or a salt thereof are/is used, the amount of (meth)acrylic acid and/or a salt thereof contained is preferably 0.1 to 30 wt %, more preferably 0.1 to 20 wt %, even more preferably 0.1 to 15 wt %, even more preferably 0.1 to 10 wt %, most preferably 0.1 to 7 wt % per 100 wt % of the total amount of the monomer represented by the above formula (4), the (meth)acrylic acid and/or the salt thereof, and the another monofunctional monomer copolymerizable therewith.

The presence of (meth)acrylic acid as a structural unit in the hard polymer layer makes it possible to form an acid anhydride structure due to cyclization caused by elimination of alkyl alcohol from a carboxyl group in a (meth)acrylic acid structural unit and an alkyl group in a (meth)acrylic acid derivative structural unit adjacent to the (meth)acrylic acid structural unit during molding processing (e.g., during heat treatment such as heat-melt kneading of the thermoplastic resin with the polymer (E)). For example, when a methyl (meth)acrylate structural unit is adjacent to a (meth)acrylic acid structural unit, a methanol elimination reaction occurs so that a glutaric anhydride structure can be formed. Further, when a benzyl (meth)acrylate structural unit is adjacent to a (meth)acrylic acid structural unit, a benzyl alcohol elimination reaction occurs so that a glutaric anhydride structure can be formed.

Further, when the hard polymer layer has (meth)acrylic salt as a structural unit, a free carboxyl group is dissociated from a salt of a carboxyl group in the (meth)acrylic salt structural unit under high temperature conditions during molding processing, and this carboxyl group and an alkyl group in a (meth)acrylic acid derivative structural unit can be cyclized to form an acid anhydride structure.

Further, when the hard polymer layer has (meth)acrylic acid as a structural unit, there is a case where a carboxyl group in the (meth)acrylic acid structural unit forms a salt in salt solidification treatment that will be described later. Also in this case, an acid anhydride structure can be formed by dissociation of a free carboxyl group from the salt of a carboxyl group under high temperature conditions during molding processing. The ratio at which (meth)acrylic acid structural units are converted to acid anhydride structures changes depending on heat history such as processing conditions, and all the (meth)acrylic acid structural units do not necessarily have to be converted to acid anhydride structures, and the degree of cyclization may be arbitrarily adjusted depending on desired characteristics.

It is to be noted that the hard polymer layer having, as a structural unit, a (meth)acrylate monomer represented by the above formula (4) may use a polyfunctional monomer having two or more non-conjugated reactive double bonds per molecule. Here, the polyfunctional monomer to be used may be the same as the polyfunctional monomer that can be used for the cross-linked polymer layer. From the viewpoint of optical isotropy and dispersibility, the amount of the polyfunctional monomer to be used for the hard polymer layer is preferably 0 to 2.0 parts by weight, more preferably 0 to 1.0 part by weight, more preferably 0 to 0.5 part by weight, even more preferably 0 to 0.04 part by weight, most preferably 0 part by weight (per 100 parts by weight of the total amount of the monomer represented by the above formula (4) and the another monofunctional monomer copolymerizable therewith).

The polymer (E) preferably has a hard polymer layer having, as a structural unit, the monomer represented by the above formula (4) in its multi-layered structure. When the polymer (E) has a hard outermost layer, the polymer (E) more preferably has a hard polymer layer having, as a structural unit, the monomer represented by the above formula (4) as the outermost layer. By allowing the polymer (E) to have a hard outermost layer, it is possible to allow the polymer (E) to be more compatible with the acrylic thermoplastic resin, further reduce orientation birefringence and photoelastic constant, and easily obtain a film having excellent optical isotropy. A soft layer having a (meth)acrylic cross-linked polymer layer ((meth)acrylic rubber) may be adjacent to the inner side of the hard outermost layer.

The polymer (E) may have one or more hard polymer layers different from the above-described hard polymer layer.

A preferred example of such a polymer (E) is one that has a soft inner layer having a cross-linked polymer layer having, as a structural unit, the monomer represented by the above formula (4) and a hard outer layer having a hard polymer layer having, as a structural unit, the monomer represented by the above formula (4). This example is preferred from the viewpoint of productivity. Another preferred example of the polymer (E) is one that has a hard inner layer composed of at least one hard polymer layer, a soft intermediate layer having a soft polymer layer composed of a cross-linked polymer layer having, as a structural unit, the monomer represented by the above formula (4), and a hard outer layer having a hard polymer layer having, as a structural unit, the monomer represented by the above formula (4). This example may further have a soft innermost layer. In the present invention, they may be appropriately used singly or in combination of two or more of them.

In this specification, the terms "soft inner layer", "soft intermediate layer", and "soft layer" (hereinafter, referred to as "soft layer") refer to an inner layer, an intermediate layer, and a layer composed of at least one soft polymer, respectively.

On the other hand, in this specification, the terms "hard outer(most) layer" and "hard inner layer" refer to an outer (most) layer and an inner layer composed of at least one hard polymer, respectively. It is to be noted that the terms "soft" and "hard" here are the same as those described above.

When the polymer (E) has a hard layer as an innermost layer, for example, when the polymer (E) has a multi-layered structure composed of a hard inner layer, a soft intermediate layer, and a hard outer layer, the innermost layer is preferably made of, for example, a hard polymer composed of 40 to 100 wt % of methacrylic ester, 0 to 60 wt % of acrylic ester, 0 to 60 wt % of an aromatic vinyl-based monomer, 0 to 10 wt % of a polyfunctional monomer, and 0 to 20 wt % of another monofunctional monomer copolymerizable with the methacrylic ester, the acrylic ester, and the aromatic vinyl-based monomer from the viewpoint of a balance between hardness and crack resistance.

When the polymer (E) has a multi-layered structure composed of, for example, a soft inner layer having a cross-linked polymer layer having, as a structural unit, the monomer represented by the above formula (4) and a hard outer layer having a polymer layer having, as a structural unit, the monomer represented by the above formula (4), a layer structure is generally formed in which the soft inner layer is completely covered with the outer hard polymer layer. However, depending on, for example, the weight ratio between the soft inner layer and the hard outer layer, there is a case where the amount of the hard polymer is not sufficient for forming such a layer structure. In this case, the layer structure does not always need to be complete, and a structure in which part of the soft inner layer is covered with the hard polymer as an outer part or a structure in which the hard polymer as an outer part is graft-polymerized with part of the soft inner layer may also be appropriately used. It is to be noted that the same applies to other examples of the multi-layered structure.

The volume-average particle diameter to the cross-linked polymer layer of the polymer (E) is preferably 20 to 450 nm, more preferably 20 to 300 nm, even more preferably 20 to 150 nm, most preferably 30 to 80 nm. If the volume-average particle diameter is less than 20 nm, there is a case where crack resistance is deteriorated. On the other hand, if the volume-average particle diameter exceeds 450 nm, there is a case where transparency is deteriorated. Further, from the viewpoint of resistance to whitening on bending, the volume-average particle diameter is preferably less than 80 nm. Further, from the viewpoint of trimming property, the volume-average particle diameter is preferably 20 to 450 nm, more preferably 50 to 450 nm, even more preferably 60 to 450 nm, even more preferably 100 to 450 nm. It is to be noted that the volume-average particle diameter can be measured by a dynamic scattering method using, for example, MICROTRAC UPA150 (manufactured by NIK- KISO CO., LTD.). More specifically, the volume-average particle diameter to the cross-linked polymer layer of the polymer (E) refers to the volume-average particle diameter of particles formed from the center to the cross-linked polymer layer of particles of the polymer (E). When the polymer (E) has two or more cross-linked polymer layers, the volume-average particle diameter to the cross-linked polymer layer of the polymer (E) refers to a volume-average particle diameter to the cross-linked polymer layer farthest from the center of the polymer (E).

The cross-linked polymer content of the polymer (E) is preferably 10 to 90 wt %, more preferably 20 to 80 wt %, even more preferably 30 to 60 wt %, most preferably 35 to 55 wt % when the amount of the polymer (E) is taken as 100 wt %. If the cross-linked polymer content is less than 10 wt %, there is a case where a resulting optical resin composition has low mechanical strength such as crack resistance. On the other hand, if the cross-linked polymer content exceeds 90 wt %, the dispersibility of the polymer (E) is impaired and a resulting molded body cannot have a smooth surface, which tends to cause appearance defects such as fish-eyes. Further, the hard polymer content is not sufficient, which tends to increase orientation birefringence or photoelastic constant so that optical isotropy cannot be maintained.

A method for producing the polymer (E) is not particularly limited, and a known emulsion polymerization method, emulsion-suspension polymerization method, suspension polymerization method, bulk polymerization method, or solution polymerization method can be used. However, the polymer (E) is particularly preferably produced by an emulsion polymerization method.

The polymer (E) is preferably obtained by multistep polymerization. More specifically, a graft copolymer obtained by multistep polymerization can be preferably used as the polymer (E), which is obtained by performing, as at least one of the steps of the multistep polymerization, polymerization of a monomer mixture containing the monomer represented by the above formula (4) and another monofunctional monomer copolymerizable therewith in the presence of cross-linked polymer-containing particles having, as a structural unit(s), the monomer represented by the above formula (4) and/or the aromatic group-containing vinyl-based monomer.

By polymerizing a monomer mixture containing the monomer represented by the above formula (4) and another monofunctional monomer copolymerizable therewith, a hard polymer having, as a structural unit, the monomer represented by the above formula (4) is formed. Examples of the another monofunctional monomer copolymerizable with the monomer represented by the above formula (4) are the same as those mentioned above, and these examples can be preferably used. The preferred amount of the another monofunctional monomer copolymerizable with the monomer represented by the above formula (4) contained in the monomer mixture is the same as that described above. Examples of the polyfunctional monomer are the same as those mentioned above, and these examples can be preferably used. The amount of the polyfunctional monomer to be blended is also the same as described above.

The cross-linked polymer-containing particles having, as a structural unit(s), the monomer represented by the formula (4) and/or the aromatic group-containing vinyl-based monomer shall be polymer particles obtained by multistep polymerization and having a cross-linked polymer having, as a structural unit(s), at least the monomer represented by the above formula (4) and/or the aromatic group-containing vinyl-based monomer, and may further have a rubber part ((meth)acrylic cross-linked polymer) obtained by polymerizing 50 to 100 wt % of acrylic ester, 50 to 0 wt % of another monofunctional monomer copolymerizable with the acrylic ester, and 0.05 to 10 parts by weight of a polyfunctional monomer (per 100 parts by weight of the total amount of acrylic ester and/or another monofunctional monomer copolymerizable therewith). The rubber part may be obtained by one-step polymerization performed by mixing all the monomer components or by polymerization performed in two or more steps by changing the composition of monomers.

The cross-linked polymer particles having, as a structural unit(s), the monomer represented by the above formula (4) and/or the aromatic group-containing vinyl-based monomer are not particularly limited as long as a cross-linked polymer (rubber part) having, as a structural unit(s), the monomer represented by the above formula (4) and/or the aromatic group-containing vinyl-based monomer is formed in at least one of the steps of multistep polymerization, and polymerization for forming a hard polymer may be performed before and/or after the polymerization for forming a cross-linked polymer having, as a structural unit(s), the monomer represented by the above formula (4) and/or the aromatic group-containing vinyl-based monomer.

Particularly, from the viewpoint of productivity, the polymer (E) to be used is preferably one obtained as a graft copolymer by (b-1) polymerizing a monomer mixture containing 1 to 100 wt % of the monomer represented by the above formula (4) and/or the aromatic group-containing vinyl-based monomer, 99 to 0 wt % of a monofunctional monomer copolymerizable therewith, and 0.05 to 10 parts by weight of a polyfunctional monomer (per 100 parts by weight of the total amount of the monomer represented by the above formula (4) and/or the aromatic group-containing vinyl-based monomer and the monofunctional monomer copolymerizable therewith) to obtain (meth)acrylic rubber-containing polymer particles, and by (b-2) polymerizing, in the presence of the crosslinked polymer-containing particles having, as a structural unit(s), the monomer represented by the above formula (4) and/or the aromatic group-containing vinyl-based monomer, a monomer mixture containing 1 to 99 wt % of the monomer represented by the above formula (4), 99 to 1 wt % of another monofunctional monomer copolymerizable therewith, and 0 to 2.0 parts by weight of a polyfunctional monomer (per 100 parts by weight of the total amount of the monomer represented by the above formula (4) and the another monofunctional monomer copolymerizable therewith). Here, the polymerization of the monomer mixture in the step (b-1) and/or the polymerization of the monomer mixture in the step (b-2) may be performed in one step by mixing all the monomer components or in two or more steps by changing the composition of monomers. Examples of the components of the monomer mixture used in the step (b-1) and preferred amounts thereof to be used are the same as those described above with reference to the cross-linked polymer layer. Examples of the components of the monomer mixture used in the step (b-2) and preferred amounts thereof to be used are the same as those described above with reference to the hard polymer layer.

The volume-average particle diameter to the cross-linked polymer layer of the multistep-polymerized graft copolymer is measured in the same manner as the volume-average particle diameter to the cross-linked polymer layer of the polymer (E), and the preferred range thereof is also the same as that of the polymer (E).

When the polymer (E) is produced by emulsion polymerization, the emulsion polymerization can be performed by a conventional method using a known emulsifying agent. Specific examples of the emulsifying agent include anionic surfactants such as sodium alkyl sulfonate, sodium alkylbenzene sulfonate, sodium dioctylsulfosuccinate, sodium lauryl sulfate, fatty acid sodium, and phosphates such as sodium polyoxyethylene lauryl ether phosphate and non-ionic surfactants such as reaction products of alkyl phenols or aliphatic alcohols and propylene oxide or ethylene oxide. These surfactants may be used singly or in combination of two or more of them. Further, if necessary, a cationic surfactant such as an alkylamine salt may be used. Among them, a phosphate (alkali metal or alkaline earth metal) such as sodium polyoxyethylene lauryl ether phosphate is particularly preferably used for polymerization from the viewpoint of improving the heat stability of a resulting polymer (E).

When the polymer (E) is produced by emulsion polymerization in such a manner, a so-called latex is obtained in which primary particles of the polymer (E) are emulsified and dispersed in an aqueous phase. Such a multi-layered polymer latex of the polymer (E) often contains polymer particles or polymer blocks that are called scale and produced as a by-product in the step of multilayer polymerization for forming particles of the polymer (E). The polymer particles or polymer blocks have a larger particle diameter and often partially or entirely have a cross-linked structure. Further, there is a case where foreign matter containing inorganic substances or dust contained in a vapor phase or water is mixed into the latex from the outside environment in the polymerization step. Mixing of the scale or foreign matter into the optical resin composition according to the present invention is undesirable because the scale or foreign matter causes optical defects in a resulting film. For this reason, for the purpose of reducing or removing the scale or foreign matter, the multi-layered polymer latex of the polymer (E) is preferably filtered through a mesh or filter. As the mesh or filter used for filtration, a widely-known one proposed for the purpose of filtering a liquid material can be used. The type, pore size, filter capacity, etc. of the mesh or filter may be appropriately selected depending on the size or desired removal rate of polymer scale produced as a by-product or foreign matter mixed into the latex as long as primary particles of the polymer (E) can pass through the pores of the mesh or filter.

The multi-layered polymer latex obtained by emulsion polymerization is subjected to known treatment such as spray drying, freeze drying, or treatment in which a coagulant such as a salt (e.g., calcium chloride or magnesium chloride) or an acid (e.g., hydrochloric acid or sulfuric acid) is added to coagulate a resin component and the resin component is separated from an aqueous phase by, if necessary, performing heat treatment or the like, washed, and dried, to obtain a powdered multi-layered polymer. When the polymer latex is coagulated to obtain a multi-layered polymer, a known coagulant such as an acid or a salt can be used, but a magnesium salt, especially magnesium sulfate, is particularly preferably used as a coagulant from the viewpoint of improving heat stability during molding of a resulting copolymer.

The polymer (E) is blended so that the amount of the cross-linked polymer layer or the cross-linked polymer-containing particles per 100 parts by weight of the optical resin composition is preferably 1 to 60 parts by weight, more preferably 1 to 30 parts by weight, even more preferably 1 to 25 parts by weight. If the amount of the cross-linked polymer layer or the cross-linked polymer-containing particles is less than 1 part by weight, there is a case where the crack resistance or vacuum moldability of a resulting film is deteriorated or a resulting film has poor optical isotropy due to an increase in photoelastic constant. On the other hand, if the amount of the cross-linked polymer layer or the cross-linked polymer-containing particles exceeds 60 parts by weight, the heat resistance, surface hardness, transparency, or resistance to whitening on bending of a resulting film tends to be deteriorated.

The ratio between the thermoplastic resin and the polymer (E) to be blended is not particularly limited as long as the above-described requirement for blending is satisfied. Depending on the amount of the cross-linked polymer layer contained in the polymer (E), the amount of the polymer (E) to be blended is preferably 1 to 99 wt %, more preferably 1 to 80 wt %, even more preferably 1 to 60 wt % when the total amount of the thermoplastic resin and the polymer (E) is taken as 100 wt %. If the amount of the polymer (E) to be blended is less than 1 wt %, there is a case where the crack resistance or vacuum moldability of a resulting film is deteriorated or a resulting film has poor optical isotropy due to an increase in photoelastic constant. On the other hand, if the amount of the polymer (E) to be blended exceeds 99 wt %, the heat resistance, surface hardness, transparency, or resistance to whitening on bending of a resulting film tends to be deteriorated.

The optical resin composition according to the present invention is a light-permeable resin composition, and can be applied for various applications requiring optical permeability. Examples of the applications of the optical resin composition according to the present invention include, but are not limited to, film-, plate-, and lens-like optical members for use in various optical devices (e.g., films, substrates, and prism sheets for use in liquid crystal display devices; lenses in lens systems for signal reading of optical disk devices; Fresnel lenses and lenticular lenses for projection screens).

The optical resin composition according to the present invention may be subjected to molding, such as extrusion molding, injection molding, compression molding, blow molding, or spinning molding, on heating to form a molded body having a shape suitable for its intended use. In this case, a mixture of particulate components of the optical resin composition may be directly subjected to molding, or pellets of the optical resin composition formed by an extruder may be subjected to molding. The optical resin composition according to the present invention is particularly useful as a film, and is successfully processed by, for example, a conventional melt extrusion method such as an inflation method or a T-die extrusion method, a calendering method, or a solvent casting method. Among them, a melt extrusion method using no solvents is particularly preferred. The use of a melt extrusion method makes it possible to reduce production cost or loads to the global environment or working environment caused by solvents.

From the viewpoint of obtaining a molded body that does not exhibit birefringence resulting from molding processing and can be practically used without problem, the value of orientation birefringence of the optical resin composition according to the present invention is preferably $-15\times10^{-4}$ to $15\times10^{-4}$, more preferably $-10\times10^{-4}$ to $10\times10^{-4}$, even more preferably $-5\times10^{-4}$ to $5\times10^{-4}$. Further, from the viewpoint of obtaining stable optical characteristics, the value of orientation birefringence of the optical resin composition according to the present invention is preferably $-3.0\times10^{-4}$ to $3.0\times10^{-4}$, more preferably $-2.6\times10^{-4}$ to $2.6\times10^{-4}$, even more preferably $-2.0\times10^{-4}$ to $2.0\times10^{-4}$, even more preferably $-1.9\times10^{-4}$ to $1.9\times10^{-4}$, even more preferably $-1.7\times10^{-4}$ to $1.7\times10^{-4}$, even more preferably $-1.6\times10^{-4}$ to $1.6\times10^{-4}$, even more preferably $-1.5\times10^{-4}$ to $1.5\times10^{-4}$, particularly preferably $-1.0\times10^{-4}$ to $1.0\times10^{-4}$, more particularly preferably $-0.5\times10^{-4}$ to $0.5\times10^{-4}$, most preferably $-0.2\times10^{-4}$ to $0.2\times10^{-4}$.

From the viewpoint of obtaining a molded body whose birefringence resulting from the application of stress in an environment of, for example, high temperature and high humidity is low, the photoelastic constant of the optical resin composition according to the present invention is preferably $-10\times10^{-12}$ to $10\times10^{-12}$, more preferably $-4\times10^{-12}$ to $4\times10^{-12}$, even more preferably $-2\times10^{-12}$ to $2\times10^{-12}$, even more preferably $-1.5\times10^{-12}$ to $1.5\times10^{-12}$, particularly preferably $-1\times10^{-12}$ to $1\times10^{-12}$, more particularly preferably $-0.5\times10^{-12}$ to $0.5\times10^{-12}$, most preferably $0.3\times10^{-12}$ to $0.3\times10^{-12}$. When the optical resin composition having a photoelastic constant of $-4\times10^{-12}$ to $4\times10^{-12}$ is formed into a film and the film is used in a liquid crystal display device, a phase difference variation, a reduction in the contrast of peripheral area of a display screen, and light leakage do not occur.

Further, the optical resin composition according to the present invention has high mechanical strength. The mechanical strength can be evaluated by, for example, tensile elongation at breakage in a tensile test, and the tensile elongation at breakage of the optical resin composition according to the present invention is preferably 10% or more, more preferably 20% or more, even more preferably 30% or more, even more preferably 40% or more, particularly preferably 50% or more, more particularly preferably 60% or more, most preferably 90% or more. The optical resin composition according to the present invention having a tensile elongation at breakage within the above range does not cause a problem such as cracking during molding processing, and is therefore extremely excellent in productivity. Further, when a product using the optical resin composition according to the present invention is actually used, trouble such as cracking does not occur. The occurrence of cracking is particularly correlated with tensile elongation at breakage, and a higher tensile elongation at breakage means higher crack resistance.

When the optical resin composition according to the present invention is molded into a film, both surfaces of the film may be brought into contact with (sandwiched between) rolls or metal belts, especially rolls or metal belts heated to a temperature around the glass transition temperature of the film, at the same time, if necessary, so that the film has higher surface properties. Further, the film may be subjected to lamination molding or may be modified by biaxial stretching depending on its intended use.

The optical resin composition according to the present invention can be formed into a film even under such high-temperature molding conditions that a T-die film molding machine is used without causing contamination of the molding machine due to scattering of a UV absorber or film defects.

Hereinbelow, one embodiment of a method for producing a film according to the present invention will be described in detail with reference to a case where the optical resin composition according to the present invention is molded into a film by melt extrusion.

It is to be noted that in the following description, a film molded by melt extrusion is referred to as "melt-extruded film" to differentiate it from a film molded by another method such as solution casting.

When the optical resin composition according to the present invention is molded into a film by melt extrusion, the optical resin composition according to the present invention is first supplied to an extruder and melted by heating.

The optical resin composition is preferably subjected to predrying before supplied to the extruder. By performing such predrying, it is possible to prevent foaming of the resin extruded from the extruder.

A method for predrying is not particularly limited, but for example, a raw material (i.e., the optical resin composition according to the present invention) may be predried by a hot air drier or the like after formed into pellets or the like.

Further, the extruder for molding the optical resin composition according to the present invention preferably has one or more devolatilizers for removing volatile matter produced during melting by heating. By providing one or more devolatilizers, it is possible to reduce deterioration of film appearance due to foaming or decomposition/deterioration reaction of the resin.

Further, during melt extrusion for molding the optical resin composition according to the present invention, an inert gas such as nitrogen or helium is preferably supplied to a cylinder of the extruder together with the resin material. By supplying an inert gas, it is possible to reduce the concentration of oxygen in a system to reduce decomposition caused by oxidation degradation, cross-linking, or degradation of appearance or quality such as yellowing.

Then, the optical resin composition melted by heating in the extruder is supplied through a gear pump or a filter to a T-die. By using a gear pump at this time, it is possible to improve uniformity of the amount of the resin to be extruded to reduce a thickness variation. On the other hand, the use of a filter makes it possible to remove foreign matter in the optical resin composition to obtain a film having excellent appearance without defects.

The filter to be used is preferably a stainless steel leaf-disk type filter that can remove foreign matter from a melted polymer, and a filter element to be used is preferably of fiber type, powder type, or complex type thereof. The filter can be preferably used for an extruder or the like for use in pelletization or film formation.

Then, the optical resin composition supplied to the T-die is extruded through the T-die as a sheet-shaped melted resin. The sheet-shaped melted resin is preferably sandwiched between two cooling rolls and then cooled to form a film.

One of the two cooling rolls sandwiching the sheet-shaped melted resin is preferably a rigid metal roll having a smooth surface and the other cooling roll is preferably a flexible roll having an elastic deformable metal elastic external cylinder having a smooth surface.

By cooling the sheet-shaped melted resin sandwiched between such rigid metal roll and flexible roll having a metal elastic external cylinder, it is possible to correct surface microirregularities or die lines to obtain a film having a smooth surface and a thickness variation of 5 μm or less.

It is to be noted that the term "cooling roll" used in this specification includes the meaning of "touch roll" and "cooling roll".

Even when the above-described rigid metal roll and flexible roll are used, there is a case where, when a film to be formed is thin, the surfaces of the cooling rolls come into contact with each other so that the external surfaces of the cooling rolls are damaged or the cooling rolls themselves are broken because both the cooling rolls have a metallic surface.

Therefore, when sandwiched between such two cooling rolls as described above to form a film, the sheet-shaped melted resin is first sandwiched between the two cooling rolls and then cooled to obtain a film.

The film according to the present invention has very high toughness and excellent flexibility and therefore does not need to be stretched to improve strength, which increases productivity due to omission of a stretching process and has a cost advantage. The film according to the present invention has high transparency in an unstretched state and therefore can have a thickness of 10 μm or more to achieve high strength. Further, the film according to the present invention exhibits substantially no orientation birefringence even when stretched and has optical isotropy. Further, the film according to the present invention is less likely to thermally shrink during secondary molding such as vacuum molding or during use at high temperature.

The film according to the present invention has the above effects even in an unstretched state, but may be stretched to further improve strength and film thickness accuracy. Further, selection of optimum stretching conditions makes it easy to produce a film that exhibits substantially no birefringence and substantially no increase in haze and has a small thickness variation.

When the film according to the present invention is a stretched film, the stretched film (uniaxially-stretched film or biaxially-stretched film) can be produced by once molding the optical resin composition according to the present invention to form an unstretched film and then by subjecting the unstretched film to uniaxial stretching or biaxial stretching. For example, a sheet-shaped melted resin is sandwiched between the above-described two cooling rolls and then cooled to once obtain an unstretched film having a thickness of 150 μm. Then, the film is subjected to vertical and horizontal biaxial stretching to have a thickness of 40 μm.

In this specification, for convenience of description, an unstretched film that is obtained by molding the optical resin composition according to the present invention but is not subjected to stretching is referred to as "raw material film".

When stretched, the raw material film may be continuously subjected to stretching just after molding or may be subjected to stretching after once stored or transferred after molding.

It is to be noted that when stretched just after molding, the raw material film may be stretched very shortly (in some cases, instantaneously) after molding in a film production process or may be stretched some time after once produced.

When the film according to the present invention is a stretched film, the raw material film shall be kept in a film form good enough to be stretched and does not always need to be in a perfect film state.

A method for stretching the raw material film is not particularly limited, and a conventionally-known any stretching method may be used. More specifically, the raw material film may be subjected to, for example, lateral stretching using a tenter, longitudinal stretching using a roll, or sequential biaxial stretching in which such lateral stretching and longitudinal stretching are sequentially performed.

Alternatively, the stretching method may be a simultaneous biaxial stretching method in which lateral stretching and longitudinal stretching are simultaneously performed or a method in which longitudinal stretching using a roll is performed and then lateral stretching using a tenter is performed.

When stretched, the raw material film is preferably once preheated to a temperature higher than a stretching temperature by 0.5° C. to 5° C., preferably 1° C. to 3° C. and then cooled to the stretching temperature before stretching.

By preheating the raw material film to a temperature within the above range, it is possible to accurately maintain the thickness of the raw material film or to prevent a resulting stretched film from having low thickness accuracy or a thickness variation. Further, it is possible to prevent the raw material film from adhering to a roll or sagging under its own weight.

On the other hand, if the preheating temperature of the raw material film is too high, an adverse effect, such as adhesion of the raw material film to a roll or sagging of the raw material film under its own weight, tends to occur. Further, if a difference between the preheating temperature and the stretching temperature of the raw material film is small, the raw material film before stretching tends to be difficult to maintain thickness accuracy or a resulting stretched film tends to have a large thickness variation or low thickness accuracy.

It is to be noted that when the optical resin composition according to the present invention is molded to form a raw material film and the raw material film is stretched, it is difficult to improve thickness accuracy by utilizing a necking phenomenon. Therefore, in the present invention, control of the above-described preheating temperature is important to maintain or improve the thickness accuracy of a resulting film.

The stretching temperature at which the raw material film is stretched is not particularly limited, and may be changed according to mechanical strength, surface properties, and thickness accuracy required for a stretched film to be produced.

In general, when the glass transition temperature of the raw material film determined by a DSC method is defined as Tg, the stretching temperature is preferably in the range of (Tg−30° C.) to (Tg+30° C.), more preferably in the range of (Tg−20° C.) to (Tg+20° C.), and even more preferably in the range of (Tg) to (Tg+20° C.).

When the stretching temperature is within the above range, it is possible to reduce the thickness variation of a resulting stretched film and to improve the mechanical properties of the film such as percentage of elongation, tear propagation strength, and resistance to flexural fatigue. Further, it is possible to prevent the occurrence of trouble such as adhesion of the film to a roll.

On the other hand, if the stretching temperature is higher than the above upper limit, a resulting stretched film tends to have a large thickness variation or the mechanical properties of the film, such as percentage of elongation, tear propagation strength, and resistance to flexural fatigue, tend not to be sufficiently improved. Further, trouble such as adhesion of the film to a roll tends to occur.

If the stretching temperature is lower than the above lower limit, a resulting stretched film tends to have a large haze or, in an extreme case, a problem, such as the occurrence of tears or cracks in the film, tends to occur during the production process.

When the raw material film is stretched, its stretching ratio is not particularly limited, either, and may be determined according to the mechanical strength, surface properties, and thickness accuracy of a stretched film to be produced. In general, depending on the stretching temperature, the stretching ratio is preferably in the range of 1.1 to 3 times, more preferably in the range of 1.3 to 2.5 times, even more preferably in the range of 1.5 to 2.3 times.

When the stretching ratio is within the above range, it is possible to significantly improve the mechanical properties of the film such as elongation percentage, tear propagation strength, and resistance to flexural fatigue. Therefore, it is possible to produce a stretched film that has a thickness variation of 5 μm or less, exhibits substantially no birefringence, and has a haze of 2.0% or less.

If necessary, the film according to the present invention may be used by laminating another film thereon with an adhesive or the like or by forming a coating layer such as a hard coating layer or the like on the surface thereof.

The optical resin composition according to the present invention may be blended with birefringent inorganic microparticles described in Japanese Patent No. 3648201 or Japanese Patent No. 4336586 or a birefringent low-molecular compound having a molecular weight of 5000 or less, preferably 1000 or less described in Japanese Patent No. 3696649 to adjust orientation birefringence.

Further, the optical resin composition according to the present invention shall contain at least one thermoplastic resin and at least one polymer (E), and one or more other resins may be added thereto without any particular limitation as long as the objects of the present invention can be achieved. Examples of the other resins include the thermoplastic resins mentioned above as examples of the thermoplastic resin, multi-layered polymers such as core-shell polymers and graft copolymers, and thermoplastic elastomers such as block polymers.

If necessary, the optical resin composition according to the present invention may contain a known additive or another resin. Examples of the additive include light stabilizers, UV absorbers, heat stabilizers, delustrants, light diffusers, colorants, dyes, pigments, antistatic agents, heat reflecting agents, lubricants, plasticizers, UV absorbers, stabilizers, and fillers.

If necessary, the surface gloss of the film according to the present invention may be reduced by a known method. This can be achieved by, for example, kneading an inorganic filler or cross-linked polymer particles with the optical resin composition. Alternatively, a film obtained from the optical resin composition may be embossed to reduce its surface gloss.

The film according to the present invention may be used by laminating on metal, plastic, glass, a material layer such as a printed layer, a decorative layer, or a protective layer, or the like. Examples of a method for laminating the film include lamination molding, wet lamination in which an adhesive is applied onto a metal plate such as a steel plate and then the film is laminated on and bonded to the metal plate by drying, dry lamination, extrusion lamination, and hot-melt lamination.

Examples of a method for laminating the film on a plastic part include insertion molding or laminate injection press molding in which a resin is injected into a mold in which a film is provided and in-mold molding in which a resin is injected into a mold in which a pre-molded film is provided.

An article on which the film according to the present invention is laminated can be used as, for example, substitutes for paint such as car interior materials and car exterior materials, building materials such as window frames, bathroom fitments, wallpapers, and floor materials, daily goods, housings for furniture or electrical equipment, housings for OA equipment such as facsimiles, laptop computers, and copy machines, front panels of liquid crystal displays of terminal equipment such as mobile phones, smartphones, and tablets, and parts of electric or electronic devices.

The film according to the present invention can be used for various purposes listed below for its properties such as heat resistance, transparency, and flexibility. More specifically, the film according to the present invention can be used for interior and exterior of cars, personal computers, mobile devices, solar batteries, and the like; solar battery backsheets; taking lenses for cameras, VTRs, and projectors; finders, filters, prisms, Fresnel lenses, lens covers, and the like for use in the field of imaging; lenses such as pick-up lenses for optical disc in CD players, DVD players, MD players, and the like for use in the field of lens; optical discs such as CDs, DVDs, and MDs for use in the field of optical recording; films for liquid crystal displays such as organic EL films, light guide plates, diffuser plates, backsheets, reflection sheets, polarizer protective films, polarizing films, transparent resin sheets, phase difference films, light diffusing films, prism sheets, and the like and surface protective films for use in the field of information devices; optical fibers, optical switches, optical connectors, and the like for use in the field of optical communications; car headlights, tail lamp lenses, inner lenses, instrument covers, sunroofs, and the like for use in the field of vehicles; medical devices such as eyeglasses, contact lenses, lenses for endoscopes, and medical supplies requiring sterilization for use in the medical field; road signs, bathroom fitments, floor materials, translucent panels for roads, lenses for double glazing, lighting windows, carports, lenses for lighting, lighting covers, sidings for construction materials, and the like for use in the fields of architecture and construction materials; microwave cooking vessels (dishes); housings for home appliances; toys; sunglasses; and stationary, etc. The film according to the present invention can be used also as a substitute for a molded article using a transfer foil sheet.

A molded article, other than a film, made of the optical resin composition according to the present invention can be used as, for example, lenses such as lenses for common cameras, lenses for video cameras, object lenses, diffraction gratings, holograms, and collimators for laser pickup, fθ lenses for laser printers, cylindrical lenses, condenser lenses or projector lenses for liquid crystal projectors, Fresnel lenses, and lenses for eyeglasses, disc substrates for compact discs (e.g., CDs and CD-ROMs), mini discs (MDs), and DVDs, members for liquid crystal elements such as light guide plates for LCDs, films for LCDs, substrates for LCDs, and adhesives for bonding liquid crystal elements, screens for projectors, optical filters, optical fibers, optical waveguides, prisms, lenses for lighting, car headlights, medical supplies requiring sterilization, microwave cooking vessels, housings for home appliances, toys, and recreation items.

The value of orientation birefringence of the film according to the present invention is preferably $-3.0\times10^{-4}$ to $3.0\times10^{-4}$, more preferably $-2.6\times10^{-4}$ to $2.6\times10^{-4}$, even more preferably $-2.0\times10^{-4}$ to $2.0\times10^{-4}$, even more preferably $-1.9\times10^{-4}$ to $1.9\times10^{-4}$, particularly preferably $-1.7\times10^{4}$ to $1.7\times10^{-4}$. Further, the film according to the present invention can have a thickness of 10 μm or more but 500 μm or less while satisfying a photoelastic constant of $-4\times10^{-12}$ to $4\times10^{-12}$ and a tensile elongation at breakage of 10% or more. Particularly, the film according to the present invention is excellent in optical characteristics such as optical homogeneity and transparency. Therefore, utilizing such optical characteristics, the film according to the present invention can be particularly preferably used for known optics applications such as liquid crystal display peripherals or organic EL device peripherals such as light guide plates for liquid crystal displays, diffuser plates, back sheets, reflection sheets, polarizing films, transparent resin sheets, phase difference films, light diffuser films, prism sheets, surface protective films, optical isotropic films, polarizer protective films, and transparent conductive films.

The film according to the present invention may be bonded to a polarizer to be used as a polarizing plate. That is, the film according to the present invention may be used as a polarizer protective film of a polarizing plate. The polarizer is not particularly limited and may be any conventionally-known polarizer. A specific example of such a polarizer is iodine-doped stretched polyvinyl alcohol. Examples of a method used to bond the film according to the present invention to a polarizer include various bonding methods generally used for acrylic films such as a method in which a primer such as a cellulose-based resin is applied to a polarizer, and then the film according to the present invention is bonded to the polarizer with an aqueous adhesive such as a polyvinyl alcohol-based adhesive and a method in which the film according to the present invention is directly bonded to a polarizer with a curable resin adhesive by UV irradiation or the like.

If necessary, the film according to the present invention may be subjected to surface treatment. For example, when subjected to surface finishing such as coating or laminated on the surface of another film, the film according to the present invention is preferably subjected to surface treatment. By subjecting the film according to the present invention to such surface treatment, it is possible to improve adhesion between the film according to the present invention and a coating material or another film to be laminated.

It is to be noted that the purpose of surface treatment of the film according to the present invention is not limited to the above purposes. The film according to the present invention may be subjected to surface treatment regardless of its intended use. Such surface treatment is not particularly limited, and examples thereof include corona treatment, plasma treatment, ultraviolet irradiation, and alkali treatment. Among them, corona treatment is preferred.

The thickness of the film according to the present invention is not particularly limited, but is preferably 500 μm or less, more preferably 300 μm or less, particularly preferably 200 μm or less. Further, the thickness of the film according to the present invention is preferably 10 μm or more, more preferably 30 μm or more, even more preferably 50 μm or more, particularly preferably 100 μm or more. The film according to the present invention having a thickness within the above range is advantageous in that the film is less likely to be deformed when subjected to vacuum molding and therefore a deep-drawn portion is less likely to be broken, and can have uniform optical characteristics and excellent transparency. On the other hand, if the thickness of the film exceeds the above upper limit, the film after molding is non-uniformly cooled and therefore tends to have non-uniform optical characteristics. If the thickness of the film is less than the above lower limit, there is a case where the film is difficult to handle.

The film according to the present invention preferably has a haze value (125 μm thick) of 2.0% or less, more preferably 1.0% or less, even more preferably 0.8% or less, particularly preferably 0.5% or less. When the film according to the present invention has a haze value within the above range, its transparency is sufficiently high and therefore the film is suitable for optics applications, decorative applications, interior applications, or vacuum molding applications requiring transparency.

The film according to the present invention can maintain high transparency even after stretching. More specifically, a stretched film obtained by biaxially stretching the film according to the present invention twice preferably has a haze value of 2.0% or less, more preferably 1.0% or less, even more preferably 0.8% or less, particularly preferably 0.5% or less. Further, a stretched film obtained by biaxially stretching the film according to the present invention twice preferably has a total light transmittance of 85% or higher, more preferably 88% or higher. The film according to the present invention can have excellent transparency even after stretching, and is therefore suitable for optics applications, decorative applications, interior applications, or vacuum molding applications requiring transparency.

The film according to the present invention preferably has a total light transmittance (125 μm thick) of 85% or higher, more preferably 88% or higher. When the film according to the present invention has a total light transmittance within the above range, its transparency is sufficiently high and therefore the film is suitable for optics applications, decorative applications, interior applications, or vacuum molding application requiring transparency.

The film according to the present invention preferably has a glass transition temperature of 100° C. or higher, more preferably 115° C. or higher, even more preferably 120° C. or higher, even more preferably 124° C. or higher. When having a glass transition temperature within the above range, the film according to the present invention can have sufficiently high heat resistance.

The film according to the present invention preferably has a tensile elongation at breakage of 10% or more, more preferably 20% or more, even more preferably 30% or more, even more preferably 40% or more, particularly preferably 50% or more, more particularly preferably 60% or more, most preferably 90% or more. When having a tensile elongation at breakage within the above range, the film according to the present invention is less likely to be cracked when cut out with a Thomson blade or a cutter blade (trimming property) and is less likely to be broken when rolled up or when the surface thereof is subjected to after-processing such as coating, vapor deposition, sputtering, or bonding to a protective film. Further, the film has high crack resistance against bending, and therefore trouble such as cracking does not occur not only when the film is subjected to after-processing but also when the film is practically used as a product. The occurrence of cracking is particularly correlated with tensile elongation at breakage, and a higher tensile elongation at breakage means higher crack resistance.

As described above, the film according to the present invention can be used as an optical film. Particularly, when used as a polarizer protective film, the film according to the present invention preferably has low optical anisotropy. Particularly, the optical anisotropy of the film is preferably low not only in its in-plane direction (length and width directions) but also in its thickness direction. In other words, both the in-plane phase difference and the absolute value of the thickness-direction phase difference of the film are preferably small. More specifically, the in-plane phase difference is preferably 10 nm or less, more preferably 6 nm or less, even more preferably 5 nm or less, even more preferably 3 nm or less. The absolute value of the thickness-direction phase difference is preferably 50 nm or less, more preferably 20 nm or less, even more preferably 10 nm or less, most preferably 5 nm or less. The film having such a phase difference can be preferably used as a polarizer protective film of a polarizing plate in a liquid crystal display device. On the other hand, if the film having an in-plane phase difference exceeding 10 nm or a thickness-direction phase difference absolute value exceeding 50 nm is used as a polarizer protective film of a polarizing plate in a liquid crystal display device, there is a case where a problem such as a reduction in the contrast of the liquid crystal display device occurs.

Phase difference is an index value calculated based on birefringence, and in-plan phase difference (Re) and thickness-direction phase difference (Rth) can be calculated by the following formulas, respectively. In the case of an ideal film that is completely optically isotropic in three dimensional directions, its in-plane phase difference Re and thickness-direction phase difference Rth are both 0.

$$Re=(nx-ny)\times d$$

$$Rth=((nx+ny)/2-nz)\times d$$

In the above formulas, nx, ny, and nz represent a refractive index in an X-axis direction that is an in-plane stretching direction (orientation direction of polymer chains), a refractive index in a Y-axis direction that is a direction perpendicular to the X axis, and a refractive index in a Z-axis direction that is a film thickness direction, respectively, d represents a film thickness, and nx–ny represents orientation birefringence. It is to be noted that in the case of a melt-extruded film, MD direction corresponds to the X axis, and in the case of a stretched film, a stretching direction corresponds to the X axis.

The value of orientation birefringence of a molded body made of the optical resin composition according to the present invention is preferably $-15\times10^{-4}$ to $15\times10^{-4}$, more preferably $-10\times10^{-4}$ to $10\times10^4$, even more preferably $-5\times10^{-4}$ to $5\times10^{-4}$, even more preferably $-1.6\times10^{-4}$ to $1.6\times10^{-4}$, particularly preferably $-1\times10^{-4}$ to $1\times10^{-4}$, more particularly preferably $-0.5\times10^{-4}$ to $0.5\times10^{-4}$, most preferably $-0.2\times10^{-4}$ to $0.2\times10^{-4}$. When the orientation birefringence of the molded body is within the above range, the molded body does not exhibit birefringence resulting from molding processing and therefore can be practically used without problem.

Further, the value of orientation birefringence of a film made of the optical resin composition according to the present invention is preferably $-3.0\times10^{-4}$ to $3.0\times10^{-4}$, more preferably $-2.6\times10^{-4}$ to $2.6\times10^{-4}$, even more preferably $-2.0\times10^{-4}$ to $2.0\times10^{-4}$, even more preferably $-1.9\times10^{-4}$ to $1.9\times10^{-4}$, even more preferably $-1.7\times10^{-4}$ to $1.7\times10^{-4}$, even more preferably $-1.6\times10^{-4}$ to $1.6\times10^{-4}$, even more preferably $-1.5\times10^{-4}$ to $1.5\times10^{-4}$, particularly preferably $-1.0\times10^{-4}$ to $1.0\times10^{-4}$, more particularly preferably $-0.5\times10^{-4}$ to $0.5\times10^{-4}$, most preferably $-0.2\times10^{-4}$ to $0.2\times10^{-4}$. When the orientation birefringence of the film is within the above range, the film does not exhibit birefringence resulting from molding processing and therefore can have stable optical characteristics. Further, the film is very suitable as an optical film for use in liquid crystal displays and the like.

The photoelastic constant of a molded body made of the optical resin composition according to the present invention is preferably $-10\times10^{-12}$ to $10\times10^{-12}$, more preferably $-4\times10^{-12}$ to $4\times10^{-12}$, even more preferably $-2\times10^{-12}$ to $2\times10^{-12}$, even more preferably $-1\times10^{-12}$ to $1\times10^{-12}$, even more preferably $-0.5\times10^{-12}$ to $0.5\times10^{-12}$, most preferably $-0.3\times10^{-12}$ to $0.3\times10^{-12}$. When the photoelastic constant of the molded body is within the above range, the molded body exhibits only small birefringence even when stress is applied thereto in an environment of, for example, high temperature and high humidity, and therefore can be practically used without problem.

The photoelastic constant of a film made of the optical resin composition according to the present invention is preferably $-4\times10^{-12}$ $Pa^{-1}$ to $4\times10^{-12}$ $Pa^{-1}$, more preferably $-1.5\times10^{-12}$ $Pa^{-1}$ to $1.5\times10^{-12}$ $Pa^{-1}$, even more preferably $-1.0\times10^{-12}$ $Pa^{-1}$ to $1.0\times10^{-12}$ $Pa^{-1}$, even more preferably $-0.5\times10^{-12}$ $Pa^{-1}$ to $0.5\times10^{-12}$ $Pa^{-1}$, most preferably $-0.3\times10^{-12}$ $Pa^{-1}$ to $0.3\times10^{-12}$ $Pa^{-1}$ or less. When the film according to the present invention having a photoelastic constant within the above range is used in a liquid crystal display device, the molded body exhibits only small birefringence even when stress is applied thereto in an environment of, for example, high temperature and high humidity, and therefore a phase difference variation, a reduction in the contrast of peripheral area of a display screen, and light leakage do not occur.

EXAMPLES

Hereinbelow, the present invention will be described more specifically with reference to examples, but is not limited to these examples. In the following description, "part(s)" and "%" represent "part(s) by weight" and "wt %", respectively unless otherwise specified.

(Volume-Average Particle Diameter to Cross-Linked Polymer Layer of Graft Copolymer)

The volume-average particle diameter to the cross-linked polymer layer of a graft copolymer (volume-average particle diameter of acrylic rubber particles) was measured using an acrylic rubber particle latex. The measurement of the volume-average particle diameter (μm) was performed using, as a measuring instrument, MICROTRAC UPA150 manufactured by NIKKISO CO., LTD.

(Polymerization Conversion Ratio)

First, part of an obtained slurry was sampled and accurately weighed, dried in a hot-air drier at 120° C. for 1 hour, and then accurately weighed to determine the weight of solid matter. Then, the ratio between the results of accurate measurement before and after drying was determined as the solid content of the slurry. Finally, a polymerization conversion ratio was calculated by the following formula using the solid content. It is to be noted that in this calculation formula 1, a chain transfer agent was regarded as a monomer charged.

Polymerization conversion ratio(%)=[(total weight of raw materials charged×solid content−total weight of raw materials other than water and monomers)/weight of monomers charged]×100

(Graft Ratio)

Two grams of the polymer (E) obtained was dissolved in 50 mL of methyl ethyl ketone, and the solution was separated into insoluble matter and soluble matter by centrifugation using a centrifugal separator (CP60E manufactured by Hitachi Koki Co., Ltd.) at 30000 rpm for 1 hour (three sets of centrifugation were performed in total). The thus obtained insoluble matter was used to calculate a graft ratio by the following formula.

Graft ratio(%)={(weight of methyl ethyl ketone insoluble matter−weight of cross-linked polymer layer)/weight of cross-linked polymer layer}×100

It is to be noted that the weight of a cross-linked polymer layer refers to the weight of monofunctional monomers charged and constituting the cross-linked polymer layer.

(Imidization Ratio)

An imidization ratio was calculated in the following manner using IR. Pellets of a product were dissolved in methylene chloride to obtain a solution, and the IR spectrum of the solution was measured at room temperature using TravelIR manufactured by SensIR Technologies. From the obtained IR spectrum, the absorption intensity of ester carbonyl groups at 1720 cm$^{-1}$ (Absester) and the absorption intensity of imide carbonyl groups at 1660 cm$^{-1}$ (Absimide) were determined, and the ratio between them was determined as an imidization ratio (Im % (IR)). The term "imidization ratio" used herein refers to the ratio of imide carbonyl groups to the total carbonyl groups.

(Glutarimide Unit Content)

A resin was subjected to $^1$H-NMR analysis using $^1$H-NMR BRUKER AvanceIII (400 MHz) to determine the amount of each monomer unit (mol %), such as a glutarimide unit or an ester unit, contained in the resin, and the monomer unit content (mol %) was converted to a monomer unit content (wt %) using the molecular weight of each monomer unit.

(Acid Value)

An obtained glutarimide acrylic resin of 0.3 g was dissolved in a mixed solvent of 37.5 mL of methylene chloride and 37.5 mL of methanol. Two drops of a phenolphthalein ethanol solution were added, and then 5 mL of a 0.1N aqueous sodium hydroxide solution was added. Then, the excess base was titrated with 0.1N hydrochloric acid, and a difference between the amount of the base added and the amount of hydrochloric acid used before neutralization was accomplished expressed in milliequivalent was determined as an acid value.

(Refractive Index)

Each composition was processed into a sheet, and the refractive index (nD) of the glutarimide acrylic resin was measured at the sodium D-line wavelength in accordance with JIS K7142 using an Abbe refractometer 2T manufactured by ATAGO CO., LTD.

(Glass Transition Temperature)

The temperature of a sample was once increased to 200° C. at a rate of 25° C./min by a differential scanning calorimetry (DSC) SSC-5200 manufactured by Seiko Instruments Inc., held at 200° C. for 10 minutes, and decreased to 50° C. at a rate of 25° C./min to preliminarily adjust the temperature of the sample, and then the DSC curve of the sample was measured while the temperature of the sample was increased to 200° C. at a temperature rise rate of 10° C./min. The integral of the obtained DSC curve (DDSC) was determined, and the glass transition temperature of the sample was determined from its maximum point.

(Total Light Transmittance and Haze Value)

The total light transmittance and haze value of a film were measured by a method specified in JIS K7105 using NDH-300A manufactured by NIPPON DENSHOKU INDUSTRIES CO., LTD.

(Film Thickness)

The film thickness of a film was measured using a digimatic indicator (manufactured by Mitutoyo Corporation).

(Preparation of Uniaxially-Stretched Film and Measurement of Orientation Birefringence)

A 25 mm×90 mm test specimen was cut out from an unstretched original film having a thickness of 125 μm obtained in each of Examples and Comparative Examples (so that its longitudinal direction was parallel to MD), both the short sides of the test specimen were held while the test specimen was maintained at a temperature higher by 30° C. than its glass transition temperature for 2 minutes, and the test specimen was uniaxially stretched twice (also referred to as "stretched 100%") at a rate of 200 mm/min in the longitudinal direction (at this time, both the long sides of the test specimen were not fixed). Thereafter, the thus obtained film was cooled to 23° C., and a sample was taken from the central portion of the film to measure birefringence (orientation birefringence) with the use of an automatic double refraction meter (KOBRA-WR manufactured by Oji Scientific Instruments) at a temperature of 23±2° C., a humidity of 50±5%, a wavelength of 590 nm, and an incidence angle of 0°. At the same time, the in-plane phase difference Re and the thickness-direction phase difference Rth (incidence angle: 40°) of the test specimen were also measured (measurement of in-plane phase difference Re and thickness-direction phase difference Rth will be described in detail later).

It is to be noted that the orientation birefringence of the polymer (E) itself was measured using a 500 μm-thick press molded sheet prepared by pressing only the polymer (E) at 190° C. A 25 mm×90 mm test specimen was cut out from the central portion of the obtained press molded sheet and stretched in the same manner as described above, and the orientation birefringence of the test specimen was measured in the same manner as described above.

(Orientation Birefringence of Original Film)

A 40 mm×40 mm test specimen was cut out from an unstretched original film (thickness: 125 μm) obtained in each of Examples and Comparative Examples, and the orientation birefringence of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°. At the same time, the in-plane phase difference Re and the thickness-direction phase difference Rth (incidence angle: 40°) of the test specimen were also measured (measurement of in-plane phase difference Re and thickness-direction phase difference Rth will be described in detail later).

(In-Plane Phase Difference Re and Thickness-Direction Phase Difference Rth)

A 40 mm×40 mm test specimen was cut out from a 125 μm-thick unstretched film (original film) obtained in each of Examples and Comparative Examples. The in-plane phase difference Re of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°.

From the thickness d of the test specimen measured using a digimatic indicator (manufactured by Mitutoyo Corporation), the refractive index n measured using an Abbe refractometer (3T manufactured by ATAGO CO., LTD.), and the in-plane phase difference Re and the phase difference in a direction inclined at 40° measured using the automatic double refraction meter at a wavelength of 590 nm, three-dimensional refractive indexes nx, ny, and nz were determined to calculate a thickness-direction phase difference, Rth=((nx+ny)/2−nz)×d. It is to be noted that the measured value was multiplied by 100 (μm)/film thickness (μm) to be converted to a value per 100 μm thickness, and the thus obtained value is shown in Table 3.

(Photoelastic Constant)

A strip-shaped test specimen of 15 mm×90 mm was cut out (so that its longitudinal direction was parallel to TD) from a 125 μm-thick unstretched film (original film) obtained in each of Examples and Comparative Examples. The photoelastic constant of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°. The measurement was performed in the following manner: one of the long sides of the film was fixed and birefringence was measured while a load applied to the other long side was increased from 0 kgf to 4 kgf by 0.5-kgf increments, and from the obtained results, the magnitude of a change in birefringence per unit stress was determined.

It is to be noted that the photoelastic constant of the polymer (E) itself was measured using a 500 μm-thick press molded sheet prepared by pressing only the polymer (E) at 190° C. A 15 mm×90 mm test specimen was cut out from the central portion of the obtained press molded sheet, and the photoelastic constant of the test specimen was measured in the same manner as described above.

(Transparency of Stretched Film)

It is an object of the present invention to provide a film excellent in transparency even after stretching. Here, the total light transmittance and haze of a biaxially-stretched film that will be described below are defined as evaluation indicators of the transparency of a stretched film. According to the present invention, the haze measured for evaluation was 2.0% or less.

(Preparation of Biaxially-Stretched Film and Measurement of Various Physical Properties)

A 13 cm×13 cm test specimen was cut out from an unstretched original film having a thickness of 125 μm, and the test specimen was maintained at a temperature higher by 20° C. than its glass transition temperature for 10 minutes in a state where all the four sides of the test specimen were held. Then, the test specimen was stretched twice (also referred to as "stretched 100%") in two directions at the same time at a rate of 120 mm/min. Thereafter, the thus obtained film was cooled to 23° C., and a sample was taken from the central portion of the film to measure birefringence (orientation birefringence) with the use of an automatic double refraction meter (KOBRA-WR manufactured by Oji Scientific Instruments) at a temperature of 23±2° C., a humidity of 50±5%, a wavelength of 590 nm, and an incidence angle of 0°. At the same time, the in-plane phase difference Re and the thickness-direction phase difference Rth (incidence angle: 40°) of the test specimen were also measured (measurement of in-plane phase difference Re and thickness-direction phase difference Rth has been described above in detail). Further, the total light transmittance and haze of the biaxially-stretched film were also measured in the same manner as described above.

(Evaluation of Mechanical Strength)

(Evaluation of Trimming Property)

The above-described biaxially-stretched film was cut to be 10 cm in length with a cutter. This was performed five times in total, and the number of cracks produced in the film was counted. When the number of cracks is smaller, trimming property and mechanical strength are superior.

(Evaluation of MIT)

The bending resistance of a film was measured by a method specified in JIS C5016 using MIT Folding Endurance Tester manufactured by Toyo Seiki Seisaku-sho, Ltd. The measurement conditions were a measurement angle of 135°, a speed of 175 times/min, an R of 0.38, and a load of 100 g.

(Evaluation of Appearance of Molded Body)

The appearance of a 60 μm-thick film was evaluated according to the following criteria.

○: The film has no surface irregularities, the surface of the film is not a fine rough surface like pearskin, and the thickness variation of the film per meter in MD is 2 μm or less.

x: The film has surface irregularities, the surface of the film is a fine rough surface like pearskin, and the thickness variation of the film per meter in MD is larger than 2 μm.

(Solvent Resistance)

A film having a thickness of 125 μm was used. A solvent of 0.5 mL was dropped onto the film using a Pasteur pipette in an atmosphere of 23° C., and the film was allowed to stand for 1 hour until the solvent was completely volatilized (N=10).

◯: Deformation such as appearance of wrinkles or irregularities in surface does not occur.

x: Deformation such as appearance of wrinkles or irregularities in surface occurs.

(Heat Stability)

Heat stability was measured using a thermo gravimetry analyzer (TGA).

SIT EXSTAR 6000, TG/DTA 6300 manufactured by Seiko Instruments Inc. was used. The measurement was performed at a start temperature of 30° C., a final temperature of 460° C., a temperature rise rate of 5° C./min, and a retention time of 0 min. Pellets before film formation were used as a sample. The amount of the sample was 20 mg, and nitrogen was used as a purge gas (400 mL/min).

The temperature of 1 wt % loss was calculated in the following manner.

Weight reduction rate=((wt−wt0)/wt0)×100% wt=weight of sample at the temperature wt0=reference weight (weight of sample at 40° C.)

The temperature at which the weight reduction rate becomes −1% is defined as the temperature of 1 wt % loss.

Production Example 1

<Production of Maleimide Acrylic Resin (A1)>

As a maleimide acrylic resin (A1), PM120N (manufactured by Asahi Kasei Chemicals Corp., methyl methacrylate-N-phenylmaleimide-styrene copolymer (81/15/4 wt %) was used.

Production Example 2

<Production of Glutarimide Acrylic Resin (B1)>

A glutarimide acrylic resin (B1) was produced using polymethylmethacrylate as a raw material resin and monomethylamine as an imidization agent.

In this production, a tandem-type reactive extruder was used, in which two extrusion reactors were connected in series.

The tandem-type reactive extruder had a first extruder and a second extruder, and both the extruders were intermeshing co-rotating twin screw extruders having a diameter of 75 mm and an L/D ratio (ratio of length L to diameter D of extruder) of 74. The raw material resin was supplied through the raw material supply port of the first extruder using a loss-in-weight feeder (manufactured by KUBOTA Corporation).

The pressure in each of the vents of the first and second extruders was reduced to −0.095 MPa. Further, the first extruder was connected to the second extruder through a pipe having a diameter of 38 mm and a length of 2 m, and a constant flow pressure valve was used as a system for controlling the pressure in a part connecting the resin discharge port of the first extruder to the raw material supply port of the second extruder.

After the resin (strand) discharged from the second extruder was cooled on a cooling conveyer and cut into pellets by a pelletizer. In order to adjust the pressure in the part connecting the resin discharge port of the first extruder and the raw material supply port of the second extruder or to detect unstable extrusion, resin pressure meters were provided at the discharge port of the first extruder, the center of the part connecting the first and second extruders, and the discharge port of the second extruder.

In the first extruder, an imide resin intermediate 1 was produced using a polymethylmethacrylate resin (Mw: 105000) as a raw material resin and monomethylamine as an imidization agent. At this time, the temperature of maximum temperature portion of the extruder was 280° C., the screw rotation speed of the extruder was 55 rpm, the supply rate of the raw material resin was 150 kg/hr, and the amount of monomethylamine added was 2.0 parts per 100 parts of the raw material resin. The constant flow pressure valve was provided just before the raw material supply port of the second extruder to adjust the pressure in the monomethylamine injection portion of the first extruder to 8 MPa.

In the second extruder, the remaining imidization agent and a by-product were devolatilized through a rear vent and a vacuum vent, and then dimethyl carbonate was added as an esterification agent to produce an imide resin intermediate 2. At this time, the temperature of each barrel of the extruder was 260° C., the screw rotation speed of the extruder was 55 rpm, and the amount of dimethyl carbonate added was 3.2 parts per 100 parts of the raw material resin. Further, the esterification agent was removed through a vent, and then an obtained glutarimide acrylic resin (B1) was extruded through a strand die, cooled in a water tank, and pelletized by a pelletizer.

The obtained glutarimide acrylic resin (B1) is a glutarimide acrylic resin obtained by copolymerization of a glutarimide unit represented by the general formula (1) and a (meth)acrylic ester unit represented by the general formula (2).

The imidization ratio, glutarimide unit content, acid value, glass transition temperature, and refractive index of the glutarimide acrylic resin (B1) were measured by the above-described methods. As a result, the imidization ratio was 13%, the glutarimide unit content was 7 wt %, the acid value was 0.4 mmol/g, the glass transition temperature was 130° C., and the refractive index was 1.50. The glutarimide acrylic resin (B1) had a negative photoelastic constant.

Production Example 3

<Production of Graft Copolymer (E1)>

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (E-1) shown in Table 2 was continuously added for 135 minutes. After 12, 24, and 36 minutes from the start of the addition of (E-1), 0.2 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y)) was added each time to the polymerization apparatus. After the addition, polymerization was further continued for 0.5 hr to obtain acrylic rubber particles (polymer (E-1)). The polymerization conversion ratio was 99.4%.

Then, the temperature in the polymerization apparatus was adjusted to 60° C., and 0.2 part of sodium formaldehyde sulfoxylate was fed into the polymerization apparatus. Then, 55.254 parts of a raw material mixture of a hard polymer layer (E-2) shown in Table 2 was continuously added for 165 minutes and polymerization was further continued for 1 hour to obtain a graft copolymer latex. The polymerization conversion ratio was 100.0%. The obtained latex was salted out and coagulated with magnesium sulfate, washed with water, and dried to obtain a white powder of a graft copolymer (E1).

The average particle diameter of rubber particles (polymer E-1) of the graft copolymer (E1) was 133 nm. The graft ratio of the graft copolymer (E1) was 77%.

Production Example 4

<Production of Graft Copolymer (E2)>

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (E-1) shown in Table 2 was continuously added for 135 minutes. After 12, 37, 62, and 87 minutes from the start of the addition of (E-1), 0.21, 0.21, 0.21, and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y)) were added to the polymerization apparatus, respectively. After the addition, polymerization was further continued for 1 hr to obtain acrylic rubber particles (polymer (E-1)). The polymerization conversion ratio was 99.6%.

Then, the temperature in the polymerization apparatus was adjusted to 60° C., and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y)) and then 0.2 part of sodium formaldehyde sulfoxylate were fed into the polymerization apparatus. Then, 55.254 parts of a raw material mixture of a hard polymer layer (E-2) shown in Table 2 was continuously added for 165 minutes, and polymerization was further continued for 1 hour to obtain a graft copolymer latex. The polymerization conversion ratio was 99.6%. The obtained latex was salted out and coagulated with magnesium sulfate, washed with water, and dried to obtain a white powder of a graft copolymer (E2).

The average particle diameter of rubber particles (polymer E-1) of the graft copolymer (E2) was 113 nm. The graft ratio of the graft copolymer (E2) was 84%.

Production Example 5

<Production of Graft Copolymer (E3)>

Polymerization was performed in the same manner as in Production Example 4 using a raw material mixture of acrylic rubber particles (E-1) with a composition shown in Table 2 and a raw material mixture of a hard polymer layer (E-2) with a composition shown in Table 2. The thus obtained latex was coagulated, washed with water, and dried to obtain a white powder of a graft copolymer (E3).

The average particle diameter of rubber particles (polymer E-1) of the graft copolymer (E3) was 111 nm. The graft ratio of the graft copolymer (E3) was 71%.

Production Example 6

<Production of Graft Copolymer (E4)>

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (E-1) shown in Table 2 was continuously added for 135 minutes. After 12, 37, 62, and 87 minutes from the start of the addition of (E-1), 0.21, 0.21, 0.21, and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y)) were added to the polymerization apparatus, respectively. After the addition, polymerization was further continued for 1 hr to obtain acrylic rubber particles (polymer (B-1)). The polymerization conversion ratio was 99.6%.

Then, the temperature in the polymerization apparatus was adjusted to 60° C., and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y)) and then 0.2 part of sodium formaldehyde sulfoxylate were fed into the polymerization apparatus. Then, 55.254 parts of a raw material mixture of a hard polymer layer (E-2) shown in Table 2 was continuously added for 165 minutes, and polymerization was further continued for 1 hour to obtain a graft copolymer latex. The polymerization conversion ratio was 99.6%. The obtained latex was salted out and coagulated with magnesium sulfate, washed with water, and dried to obtain a white powder of a graft copolymer (E4).

The average particle diameter of rubber particles (polymer E-1) of the graft copolymer (E4) was 103 nm. The graft ratio of the graft copolymer (E4) was 92%.

TABLE 2

|  |  | Polymer (E) | | | |
| --- | --- | --- | --- | --- | --- |
|  |  | E1 | E2 | E3 | E4 |
| Acrylic cross-linked polymer layer (acrylic rubber particles) (E-1) | Monofunctional monomer content in (E) (parts) | 45 | 45 | 45 | 45 |
|  | Butyl acrylate (%) | 90 | 78 | 73 | 82 |
|  | Methyl methacrylate (%) | 10 | – | – | – |
|  | Benzyl methacrylate (%) | – | 22 | – | – |
|  | Benzyl acrylate (%) | – | – | 27 | – |
|  | Styrene (%) | – | – | – | 18 |
|  | Allyl methacrylate (part) | 0.225 | 0.225 | 0.225 | 0.225 |
|  | Cumene hydroperoxide (part) | 0.041 | 0.041 | 0.041 | 0.041 |
|  | Volume-average particle diameter of (E-1) (nm) | 133 | 113 | 111 | 103 |
| Hard polymer layer (E-2) | Monofunctional monomer content in (E) (parts) | 55 | 55 | 55 | 55 |
|  | Methyl methacrylate (%) | 57.8 | 53.1 | 53.1 | 53.1 |
|  | Butyl acrylate (%) | 4 | 4 | 4 | 4 |
|  | Benzyl methacrylate (%) | 38.2 | 38.2 | 38.2 | 38.2 |
|  | Methacrylic acid (%) | – | 4.7 | 4.7 | 4.7 |
|  | t-dodecyl mercaptan (part) | 0 | – | – | – |
|  | Cumene hydroperoxide (part) | 0.254 | 0.254 | 0.254 | 0.254 |
| Sign of birefringence of polymer (E) itself | Orientation birefringence | + | + | + | – |
|  | Photoelastic constant | + | + | + | + |

Examples 1 to 8, Comparative Examples 1 and 2

A mixture of the resin (A), the resin (B), and the polymer (E) shown in Table 3 was supplied at a rate of 10 kg/hr to a single screw extruder having a full-flight screw with a diameter of 40 mm. The preset temperature of temperature control zone of the extruder was 255° C. and the screw rotation speed of the extruder was 52 rpm. The resin extruded as a strand through a die provided at the outlet of the extruder was cooled in a water tank and pelletized by a pelletizer to obtain pellets.

The obtained pellets were supplied at a rate of 10 kg/hr to a single screw extruder equipped with a leaf disk filter with a pore size of 5 µm and connected to a T-die at the outlet thereof and melt-extruded to obtain a film of Example having a thickness (125 µm, 60 µm) shown in Table 3. The preset temperature of temperature control zone of the extruder was 260° C. and the screw rotation speed of the extruder was 20 rpm. Various physical properties of the film were evaluated.

TABLE 3

|  |  |  |  | Example | | | | | |
| --- | --- | --- | --- | --- | --- | --- | --- | --- | --- |
|  |  |  |  | 1 | 2 | 3 | 4 | 5 | 6 |
|  |  | Resin (A) | Type | A1 | A1 | A1 | A1 | A1 | A1 |
|  |  |  | (parts) | 31.5 | 30 | 30 | 31.5 | 30 | 30 |
|  |  | Resin (B) | Type | B1 | B1 | B1 | B1 | B1 | B1 |
|  |  |  | (parts) | 58.5 | 55.7 | 50 | 58.5 | 55.7 | 50 |
|  |  | Polymer (E) | Type | E2 | E2 | E2 | E3 | E3 | E3 |
|  |  |  | (parts) | 10 | 14.3 | 20 | 10 | 14.3 | 20 |
| Film physical properties |  | Film thickness | (µm) | 125 | 125 | 125 | 125 | 125 | 125 |
|  |  | Glass transition temperature (DSC) | (° C.) | 128 | 128 | 128 | 128 | 128 | 128 |
|  |  | Total light transmittance | (%) | 92 | 92 | 92.1 | 92.2 | 92.1 | 92.1 |
|  |  | Haze value | (%) | 0.5 | 0.6 | 0.6 | 0.4 | 0.7 | 0.6 |
|  | Unstretched | Photoelastic constant ($\times 10^{-12}$) | ($Pa^{-1}$) | 0.00 | 0.29 | 0.32 | 0.00 | 0.27 | 0.81 |
|  |  | Orientation birefringence ($\times 10^{-4}$) |  | ±0.03 | ±0.02 | ±0.05 | ±0.04 | ±0.05 | ±0.02 |
|  |  | Re (per 100 µm) | nm | ±0.3 | ±0.2 | ±0.5 | ±0.4 | ±0.5 | ±0.2 |
|  |  | Rth (per 100 µm) | nm | 0.3 | 1.5 | 0.3 | −0.3 | 0.6 | 1.3 |
|  |  | Heat stability | TGA Temperature of 1 wt % loss (° C.) | 341 | 341 | 341 | 341 | 341 | 341 |
|  | 2-fold stretching (uniaxial stretching) | Orientation birefringence ($\times 10^{-4}$) |  | −1.56 | −1.82 | −1.31 | −1.83 | −1.55 | −1.39 |
|  |  | Re (per 100 µm) | nm | 9.9 | 11.3 | 7.5 | 11.1 | 9.6 | 8.6 |
|  |  | Rth (per 100 µm) | nm | −5.5 | −8.1 | −2.5 | −6.6 | −6.1 | −4.8 |
|  | 2-fold stretching (biaxial stretching) | Film thickness | (µm) | 30 | 28 | 30 | 30 | 23 | 30 |
|  |  | Orientation birefringence ($\times 10^{-4}$) |  | 0.40 | ±0 | ±0.07 | ±0.17 | 0.5 | ±0.19 |
|  |  | Re (per 100 µm) | nm | 4.0 | ±0 | ±0.7 | ±07 | 0.9 | ±0.7 |
|  |  | Rth (per 100 µm) | nm | −2.0 | −2.1 | −2.0 | −2.0 | −2.6 | −2.0 |
|  |  | Total light transmittance | (%) | 92.2 | 92.2 | 92.2 | 92.3 | 92.2 | 92.3 |
|  |  | Haze value | (%) | 0.3 | 0.3 | 0.5 | 0.3 | 0.4 | 0.5 |
|  |  | Evaluation of trimming property | Number of cracks | 37 | 18 | 13 | 28 | 31 | 4 |
|  |  | MIT | Number of times of bending | 3594 | 8416 | 14572 | 4161 | 4841 | 9697 |
|  |  | Evaluation of appearance of molded body |  | ○ | ○ | ○ | ○ | ○ | ○ |
|  |  | Solvent resistance |  | ○ | ○ | ○ | ○ | ○ | ○ |

TABLE 3-continued

|  |  |  |  | Example | | Comparative Example | |
|---|---|---|---|---|---|---|---|
|  |  |  |  | 7 | 8 | 1 | 2 |
|  |  | Resin (A) | Type | A1 | A1 | A1 | A1 |
|  |  |  | (parts) | 31.5 | 30 | 53 | 35 |
|  |  | Resin (B) | Type | B1 | B1 | — | B1 |
|  |  |  | (parts) | 58.5 | 55.7 | — | 65 |
|  |  | Polymer (E) | Type | E4 | E4 | E1 | — |
|  |  |  | (parts) | 10 | 14.3 | 47 | — |
| Film | | Film thickness | (μm) | 125 | 125 | 125 | 125 |
| physical | | Glass transition temperature (DSC) | (° C.) | 128 | 128 | 121 | 129 |
| properties | | Total light transmittance | (%) | 92.1 | 92.1 | 92.1 | 92.4 |
|  |  | Haze value | (%) | 0.6 | 0.8 | 0.62 | 0.4 |
|  | Unstretched | Photoelastic constant ($\times 10^{-12}$) | ($Pa^{-1}$) | 0.00 | 0.00 | −0.09 | −0.73 |
|  |  | Orientation birefringence ($\times 10^{-4}$) |  | −0.05 | −0.05 | ±0.07 | ±0.02 |
|  |  | Re (per 100 μm) | nm | 0.5 | 0.5 | ±0.7 | ±0.2 |
|  |  | Rth (per 100 μm) | nm | −1.3 | −1.1 | −1.6 | 1.5 |
|  |  | Heat stability | TGA Temperature of 1 wt % loss (° C.) | 341 | 341 | 286 | 333 |
|  | 2-fold stretching (uniaxial stretching) | Orientation birefringence ($\times 10^{-4}$) |  | −2.35 | −2.54 | 0.33 | −2.01 |
|  |  | Re (per 100 μm) | nm | 15.2 | 15.0 | 3.3 | 20.1 |
|  |  | Rth (per 100 μm) | nm | −7.9 | −6.3 | 1.1 | −12.0 |
|  | 2-fold stretching (biaxial stretching) | Film thickness | (μm) | 28 | 30 | 33 | 27 |
|  |  | Orientation birefringence ($\times 10^{-4}$) |  | 0.49 | ±0.19 | 0.07 | ±0.08 |
|  |  | Re (per 100 μm) | nm | 0.7 | ±0.7 | 0.7 | ±0.8 |
|  |  | Rth (per 100 μm) | nm | −2.1 | −2.0 | 1.2 | 16.7 |
|  |  | Total light transmittance | (%) | 92.2 | 92.2 | 92.8 | 92.3 |
|  |  | Haze value | (%) | 0.3 | 0.3 | 2.5 | 0.2 |
|  |  | Evaluation of trimming property | Number of cracks | 35 | 23 | 0 | 56 |
|  |  | MIT | Number of times of bending | 4663 | 3381 | 30128 | 1510 |
|  | | Evaluation of appearance of molded body |  | ◯ | ◯ | X | ◯ |
|  | | Solvent resistance |  | ◯ | ◯ | X | ◯ |

* The symbol "±" means that the sign could not be identified.

As shown in Table 3, the films obtained in Examples 1 to 8 have excellent mechanical strength in addition to high heat stability, high heat resistance, high transparency, low orientation birefringence, low photoelastic constant, and excellent optical isotropy. Further, the films have high transparency, low orientation birefringence, and excellent optical isotropy even after biaxial stretching.

The invention claimed is:

1. An optical resin composition comprising:
a thermoplastic resin; and
a multistep-polymerized graft copolymer obtained by polymerizing, in the presence of crosslinked polymer-containing particles formed by polymerizing a monomer mixture (a) containing a monomer represented by the following general formula (4) and/or an aromatic group-containing vinyl-based monomer and a polyfunctional monomer, a monomer mixture (b) containing a monomer represented by the following general formula (4) and another monofunctional monomer copolymerizable therewith,

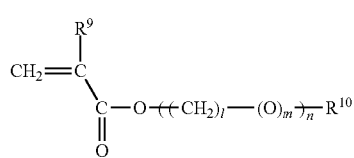

(4)

wherein $R^9$ is a hydrogen atom or a substituted or unsubstituted linear or branched alkyl group having 1 to 12 carbon atoms, $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, l is an integer of 1 to 4, m is an integer of 0 or 1, and n is an integer of 0 to 10, the layer comprising the polymer of the monomer mixture (b) being an outermost layer of the multistep-polymerized graft copolymer, the monomer represented by the above general formula (4) is benzyl (meth)acrylate, a photoelastic constant of the thermoplastic resin and a photoelastic constant of the multistep-polymerized graft copolymer are opposite in sign, and an orientation birefringence of the thermoplastic resin and an orientation birefringence of the multistep-polymerized graft copolymer are opposite in sign.

2. An optical resin composition comprising:
a thermoplastic resin; and
a multi-layered polymer having a cross-linked polymer layer formed by polymerizing a monomer mixture (a) containing a monomer represented by the following general formula (4) and/or an aromatic group-containing vinyl-based monomer and a polyfunctional monomer, and a polymer layer obtained by polymerizing a monomer mixture (b) containing a monomer represented by the following general formula (4) and another monofunctional monomer copolymerizable therewith,

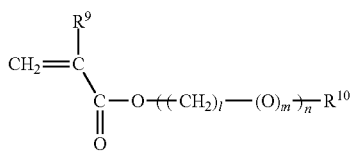

(4)

wherein R$^9$ is a hydrogen atom or a substituted or unsubstituted linear or branched alkyl group having 1 to 12 carbon atoms, R$^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, l is an integer of 1 to 4, m is an integer of 0 or 1, and n is an integer of 0 to 10, the layer comprising the polymer of the monomer mixture (b) being an outermost layer of the multistep-polymerized graft copolymer, the monomer represented by the above general formula (4) is benzyl (meth)acrylate, a photoelastic constant of the thermoplastic resin and a photoelastic constant of the multi-layered polymer are opposite in sign, and an orientation birefringence of the thermoplastic resin and an orientation birefringence of the multi-layered polymer are opposite in sign.

3. The optical resin composition according to claim 1, wherein the thermoplastic resin is an acrylic thermoplastic resin.

4. The optical resin composition according to claim 1, wherein the thermoplastic resin is at least one selected from the group consisting of a maleimide acrylic resin, a glutarimide acrylic resin, a lactone ring-containing acrylic polymer, a partially-hydrogenated styrene-based polymer obtained by partial hydrogenation of aromatic rings of a styrene-based polymer obtained by polymerization of a styrene monomer and another monomer copolymerizable therewith, an acrylic polymer containing a cyclic acid anhydride repeating unit, and a hydroxyl group- and/or carboxyl group-containing acrylic polymer.

5. The optical resin composition according to claim 1, wherein the thermoplastic resin contains a maleimide acrylic resin having a maleimide unit represented by the following general formula (5) and a (meth)acrylic ester unit,

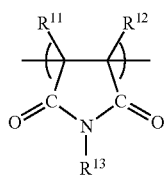

(5)

wherein R$^{11}$ and R$^{12}$ are each independently a hydrogen atom, an alkyl group having 1 to 12 carbon atoms, or an aryl group having 6 to 14 carbon atoms, and R$^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from the following group A, group A: halogen atom, hydroxyl group, nitro group, alkoxy group having 1 to 12 carbon atoms, alkyl group having 1 to 12 carbon atoms, and arylalkyl group having 7 to 14 carbon atoms.

6. The optical resin composition according to claim 5, wherein the maleimide acrylic resin further has a unit represented by the following general formula (3),

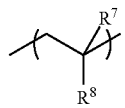

(3)

wherein R$^7$ is hydrogen or an alkyl group having 1 to 8 carbon atoms and R$^8$ is an aryl group having 6 to 10 carbon atoms.

7. The optical resin composition according to claim 1, wherein the thermoplastic resin contains a glutarimide acrylic resin having a unit represented by the following general formula (1) and a unit represented by the following general formula (2),

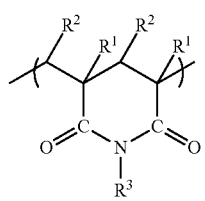

(1)

wherein R$^1$ and R$^2$ are each independently hydrogen or an alkyl group having 1 to 8 carbon atoms and R$^3$ is hydrogen, an alkyl group having 1 to 18 carbon atoms, a cycloalkyl group having 3 to 12 carbon atoms, or an aromatic ring-containing substituent group having 5 to 15 carbon atoms, and

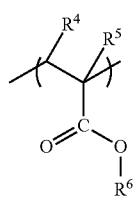

(2)

wherein R$^4$ and R$^5$ are each independently hydrogen or an alkyl group having 1 to 8 carbon atoms and R$^6$ is an alkyl group having 1 to 18 carbon atoms, a cycloalkyl group having 3 to 12 carbon atoms, or an aromatic ring-containing substituent group having 5 to 15 carbon atoms.

8. The optical resin composition according to claim 1, wherein an amount of the crosslinked polymer-containing particles contained in the multistep-polymerized graft copolymer or an amount of the crosslinked polymer layer contained in the multi-layered polymer is 1 to 60 parts by weight per 100 parts by weight of the optical resin composition.

9. The optical resin composition according to claim 1, wherein the aromatic group-containing vinyl-based monomer is styrene and/or a derivative thereof.

10. The optical resin composition according to claim 1, wherein the monomer mixture (a) contains acrylic ester and/or methacrylic ester.

11. The optical resin composition according to claim 1, wherein the monomer mixture (b) contains acrylic ester and/or methacrylic ester.

12. The optical resin composition according to claim 1, wherein the monomer mixture (b) contains (meth)acrylic acid and/or a salt thereof.

13. A pellet obtained by heat-melting the optical resin composition according to claim 1.

14. A molded body made of the optical resin composition according to claim 1.

15. A film made of the optical resin composition according to claim 1.

16. The film according to claim 15, which is formed by melt-extrusion molding.

17. The film according to claim 15, which has a thickness of 10 to 500 μm.

18. A stretched film obtained by stretching the film according to claim 15.

19. The stretched film according to claim 18, which has a thickness of 10 to 500 μm.

20. A multi-layered polymer comprising: a layer comprising a cross-linked polymer of a monomer mixture (a) containing a monomer represented by the following general formula (4) and a polyfunctional monomer; and a layer comprising a polymer of a monomer mixture (b) containing a monomer represented by the following general formula (4) and another monofunctional monomer copolymerizable therewith,

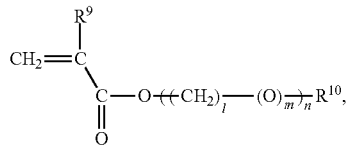

(4)

where $R^9$ is a hydrogen atom or a substituted or unsubstituted linear or branched alkyl group having 1 to 12 carbon atoms, $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, l is an integer of 1 to 4, m is an integer of 0 or 1, and n is an integer of 0 to 10, the layer comprising the polymer of the monomer mixture (b) being an outermost layer of the multistep-polymerized graft copolymer, and the monomer represented by the above general formula (4) is benzyl (meth)acrylate.

21. The multi-layered polymer according to claim 20, wherein the monomer mixture (a) contains acrylic ester and/or methacrylic ester.

22. The multi-layered polymer according to claim 20, wherein the monomer mixture (b) contains acrylic ester and/or methacrylic ester.

23. The multi-layered polymer according to claim 20, wherein the monomer mixture (b) contains (meth)acrylic acid and/or a salt thereof.

* * * * *